(12) United States Patent
Duffy et al.

(10) Patent No.: US 7,882,363 B2
(45) Date of Patent: Feb. 1, 2011

(54) BIOMETRIC AUTHENTICATION SYSTEM

(75) Inventors: Dominic Gavan Duffy, Cambridgeshire (GB); Aled Wynne Jones, Cambridgeshire (GB)

(73) Assignee: Fountain Venture AS, Oslo (NO)

( * ) Notice: Subject to any disclaimer, the term of this patent is extended or adjusted under 35 U.S.C. 154(b) by 1376 days.

(21) Appl. No.: 10/516,174

(22) PCT Filed: Jun. 2, 2003

(86) PCT No.: PCT/GB03/02382

§ 371 (c)(1),
(2), (4) Date: Sep. 16, 2005

(87) PCT Pub. No.: WO03/103217

PCT Pub. Date: Dec. 11, 2003

(65) Prior Publication Data

US 2006/0075255 A1    Apr. 6, 2006

(30) Foreign Application Priority Data

| May 31, 2002 | (WO) | PCT/GB02/02512 |
| Aug. 14, 2002 | (GB) | 0218898.5 |
| Dec. 5, 2002 | (GB) | 0228428.9 |
| May 21, 2003 | (GB) | 0311691.0 |

(51) Int. Cl.
*G06F 21/00* (2006.01)

(52) U.S. Cl. ............... 713/186; 380/4; 380/23; 380/44; 382/115; 382/232; 382/250; 713/176; 713/177; 713/178; 713/179; 713/183; 713/7; 713/202; 714/176; 726/7; 726/19

(58) Field of Classification Search .................. 713/186
See application file for complete search history.

(56) References Cited

U.S. PATENT DOCUMENTS

| 4,109,237 A | 8/1978 | Hill |
| 4,135,147 A | 1/1979 | Riganati et al. |

(Continued)

FOREIGN PATENT DOCUMENTS

CN    1281608 A    1/2001

(Continued)

OTHER PUBLICATIONS

Co-pending U.S. Appl. No. 10/516,173, filed Nov. 30, 2004.

(Continued)

*Primary Examiner*—William R Korzuch
*Assistant Examiner*—Bryan Wright
(74) *Attorney, Agent, or Firm*—Sheer & Vaughn, PLLC

(57) ABSTRACT

There is described an authentication system in which during an enrolment process a distinctive characteristic of a subject being enrolled is measured to generate a reference number representative of the subject. Authentication data is then generated using the reference number, and the authentication data is stored for use in a subsequent verification process. During verification, the representative characteristic of the subject being verified is re-measured to generate a test number representative of the subject being verified and the authentication data during enrolment is retrieved. The authentication system then checks for equality between the test number and the reference number using the retrieved authentication data. If the test number and the reference number are equal, then the authenticity of the subject is verified, otherwise the authenticity is denied.

35 Claims, 23 Drawing Sheets

U.S. PATENT DOCUMENTS

| | | | |
|---|---|---|---|
| 4,187,392 | A | 2/1980 | Safford |
| 4,316,055 | A | 2/1982 | Feistel |
| 4,641,349 | A | 2/1987 | Flom et al. |
| 4,805,222 | A | 2/1989 | Young et al. |
| 5,067,162 | A | 11/1991 | Driscoll et al. |
| 5,291,560 | A | 3/1994 | Daugman |
| 5,347,580 | A | 9/1994 | Molva et al. |
| 5,497,430 | A | 3/1996 | Sadovnik et al. |
| 5,541,994 | A | 7/1996 | Tomko et al. |
| 5,680,460 | A | 10/1997 | Tomko et al. |
| 5,680,470 | A | 10/1997 | Moussa et al. |
| 5,712,807 | A | 1/1998 | Bangham |
| 5,832,091 | A | 11/1998 | Tomko et al. |
| 5,933,516 | A | 8/1999 | Tu et al. |
| 5,991,408 | A | 11/1999 | Pearson et al. |
| 6,035,398 | A | 3/2000 | Bjorn |
| 6,038,315 | A | 3/2000 | Strait et al. |
| 6,067,369 | A | 5/2000 | Kamei |
| 6,078,667 | A | 6/2000 | Johnson |
| 6,098,330 | A | 8/2000 | Schmitt et al. |
| 6,154,285 | A | 11/2000 | Teng et al. |
| 6,170,073 | B1 | 1/2001 | Jarvinen et al. |
| 6,185,316 | B1 * | 2/2001 | Buffam ............ 382/115 |
| 6,202,151 | B1 * | 3/2001 | Musgrave et al. ........ 713/186 |
| 6,219,794 | B1 | 4/2001 | Soutar et al. |
| 6,330,674 | B1 | 12/2001 | Angelo et al. |
| 6,363,485 | B1 | 3/2002 | Adams et al. |
| 6,567,765 | B1 | 5/2003 | Wu et al. |
| 6,678,821 | B1 | 1/2004 | Waugh et al. |
| 6,687,375 | B1 | 2/2004 | Matyas et al. |
| 6,901,145 | B1 | 5/2005 | Bohannon et al. |
| 6,940,976 | B1 | 9/2005 | Matyas et al. |
| 6,957,337 | B1 | 10/2005 | Chainer et al. |
| 6,959,874 | B2 | 11/2005 | Bardwell |
| 6,964,023 | B2 | 11/2005 | Maes et al. |
| 6,968,459 | B1 | 11/2005 | Morgan et al. |
| 7,046,829 | B2 | 5/2006 | Udupa et al. |
| 7,200,549 | B1 | 4/2007 | Fujii et al. |
| 7,274,804 | B2 | 9/2007 | Hamid |
| 7,526,653 | B1 | 4/2009 | Vogel et al. |
| 2001/0025342 | A1 * | 9/2001 | Uchida ............ 713/186 |
| 2002/0056040 | A1 | 5/2002 | Simms |
| 2002/0124176 | A1 | 9/2002 | Epstein |
| 2002/0174347 | A1 * | 11/2002 | Ting ............ 713/186 |
| 2002/0199103 | A1 | 12/2002 | Dube |
| 2003/0179909 | A1 | 9/2003 | Wong et al. |
| 2003/0204732 | A1 | 10/2003 | Audebert et al. |
| 2003/0217264 | A1 | 11/2003 | Martin et al. |
| 2004/0107367 | A1 | 6/2004 | Kisters |
| 2004/0111625 | A1 | 6/2004 | Duffy et al. |
| 2004/0128502 | A1 | 7/2004 | Royer |
| 2004/0218762 | A1 | 11/2004 | La Saint et al. |
| 2004/0243356 | A1 | 12/2004 | Duffy et al. |
| 2005/0021954 | A1 | 1/2005 | Kung |
| 2005/0246763 | A1 | 11/2005 | Corcoran et al. |
| 2006/0075255 | A1 | 4/2006 | Duffy et al. |
| 2006/0083372 | A1 | 4/2006 | Chang et al. |
| 2006/0090114 | A1 | 4/2006 | Duffy et al. |
| 2006/0153369 | A1 | 7/2006 | Beeson |
| 2006/0198514 | A1 | 9/2006 | Lyseggen et al. |
| 2006/0227974 | A1 | 10/2006 | Haraszti |
| 2008/0216147 | A1 | 9/2008 | Duffy |

FOREIGN PATENT DOCUMENTS

| | | | |
|---|---|---|---|
| DE | 42 43 908 | A1 | 6/1994 |
| DE | 4243908 | A1 | 6/1994 |
| DE | 197 15 644 | A1 | 10/1998 |
| DE | 19715644 | A1 | 10/1998 |
| DE | 199 36 097 | A1 | 2/2001 |
| DE | 19936097 | A1 | 2/2001 |
| EP | 0779595 | A2 | 6/1997 |
| EP | 0786735 | A2 | 7/1997 |
| JP | 4-55849 | U | 5/1992 |
| JP | 9-147072 | A | 6/1997 |
| JP | 9-161053 | A | 6/1997 |
| JP | 11-73103 | A | 3/1999 |
| WO | WO 98/48538 | | 10/1998 |
| WO | WO 99/65175 | | 12/1999 |
| WO | WO 00/14716 | | 3/2000 |
| WO | WO 00/51280 | | 8/2000 |
| WO | WO 00/65770 | | 11/2000 |
| WO | WO 00/74301 | A1 | 12/2000 |
| WO | WO 01/63385 | A1 | 8/2001 |
| WO | WO 02/052480 | A1 | 7/2002 |
| WO | WO 02/065693 | A2 | 8/2002 |
| WO | WO 02/098053 | A2 | 12/2002 |
| WO | WO 03/034655 | A1 | 4/2003 |
| WO | WO 03/065169 | A2 | 8/2003 |
| WO | WO 03/103216 | A2 | 12/2003 |
| WO | WO 03/103217 | A1 | 12/2003 |
| WO | WO 2004/006076 | A2 | 1/2004 |
| WO | WO 2005/121921 | A1 | 12/2005 |

OTHER PUBLICATIONS

Monrose et al., "Cryptographic Key Generation From Voice," IEEE Symposium on Security and Privacy, pp. 202-213, (2001).

Daugman, J., "How Iris Recognition Works," University of Cambridge, The Computer Laboratory, Cambridge CB2 3QG, U.K., Available at web page, www.CL.cam.ac.uk/users/jdg1000/, pp. 1-10.

NCIPHER, "Secure Execution Engine," White Paper Published by NCIPHER, pp. 1-11.

Řiha, Z., et al., "Biometric Authentication Systems," Faculty of Informatics Masaryk University, FI MU report Series, FIMU-RS-2000-08, pp. 1-44, (Nov. 2000).

Daugman, J.G., "High Confidence Visual Recognition of Persons by a Test of Statistical Independence," IEEE Transactions on Patent Analysis and Machine Intelligence, vol. 15, No. 11, pp. 1148-1161, (Nov. 1993).

Davida, G.I., et al., "On the Relation of Error Correction and Cryptography to an Off Line Biometric Based Identification Scheme," pp. 1-10, Nov. 29, 1998.

Claus et al., "Biometric Hash Based on Statistical Features of Online Signatures", Pattern Recognition, 2002, Proceedings.16th International Conference on Publication Date:2002, vol. 1, pp. 123-126.

Hao et al., "Combining Crypto with Biometrics Effectively", IEEE Transactions on Computers, Sep. 2006, pp. 1081-1088, vol. 55, No. 9, IEEE Computer Society.

Uludag et al., "Biometric Cryptosystems: Issues and Challenges", Proceedings of The IEEE, Jun. 2004, vol. 92, No. 6, pp. 948-960.

Daugman, "How IRIS Recognition Works", pp. 1-10, University of Cambridge, The Computer Laboratory, Cambridge CB2 3QG, U.K., www.CL.Cam.ac.uk/users/jdg1000.

Monrose et al., "Cryptographic Key Generation From Voice", IEEE Symposium on Security and Privacy, 2001, pp. 202-213.

"Secure Execution Engine" White Paper, pp. 1-11, NCIPHER.

Riha et al. "Biometric Authentication Systems", FI MU Report Series, Nov. 2000, pp. 1-44, Faculty of Informatics Masaryk University.

Daugman, "High Confidence Visual Recognition of Persons by a Test of Statistical Independence", IEEE Transactions on Pattern Analysis and Machine Intelligence, vol. 15, No. 11, Nov. 1993, pp. 1148-1161.

Davida et al., "On the Relation of Error Correction and Cryptography to an Off Line Biometric Based Identification Scheme," Nov. 29, 1998, pp. 1-10.

Client Security In the Enterprise Network: DELL's Perspective, DELL Highlight, Feb. 2000, pp. 1-6.

Cavoukian et al., "Biometric Encryptioin: A Positive-Sum Technology that Achieves Strong Authentication", Security and Privacy, Mar. 2007, pp. 1-48, Information and Privacy Commissioner.

Clancy, Secure Smartcard-Based Fingerprint Authentication, WMBA'03, Nov. 8, 2003, pp. 45-52, Berkeley, California, USA.

Mark, The Development of Destination-Specific Biometric Authentication, pp. 77-80.

UMTS 33.22 V1.0.0, 3GPP Systems and Services TSG, Security WG, Feb. 2-4, 1999, pp. 1-18.

David et al., "Smart Cards and Biometrics: Your Key to PKT", Mar. 1, 1999, http://www.linuxjournal.com/article/3013.

* cited by examiner

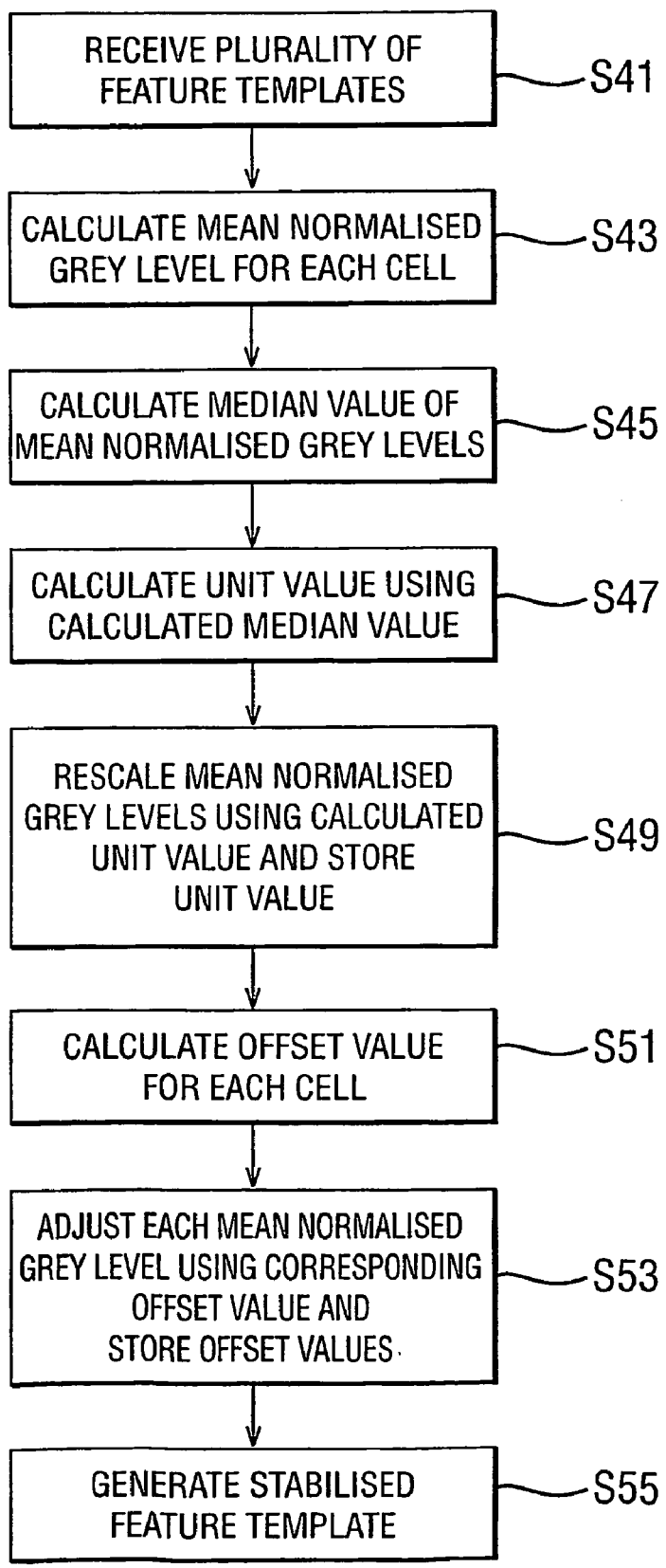

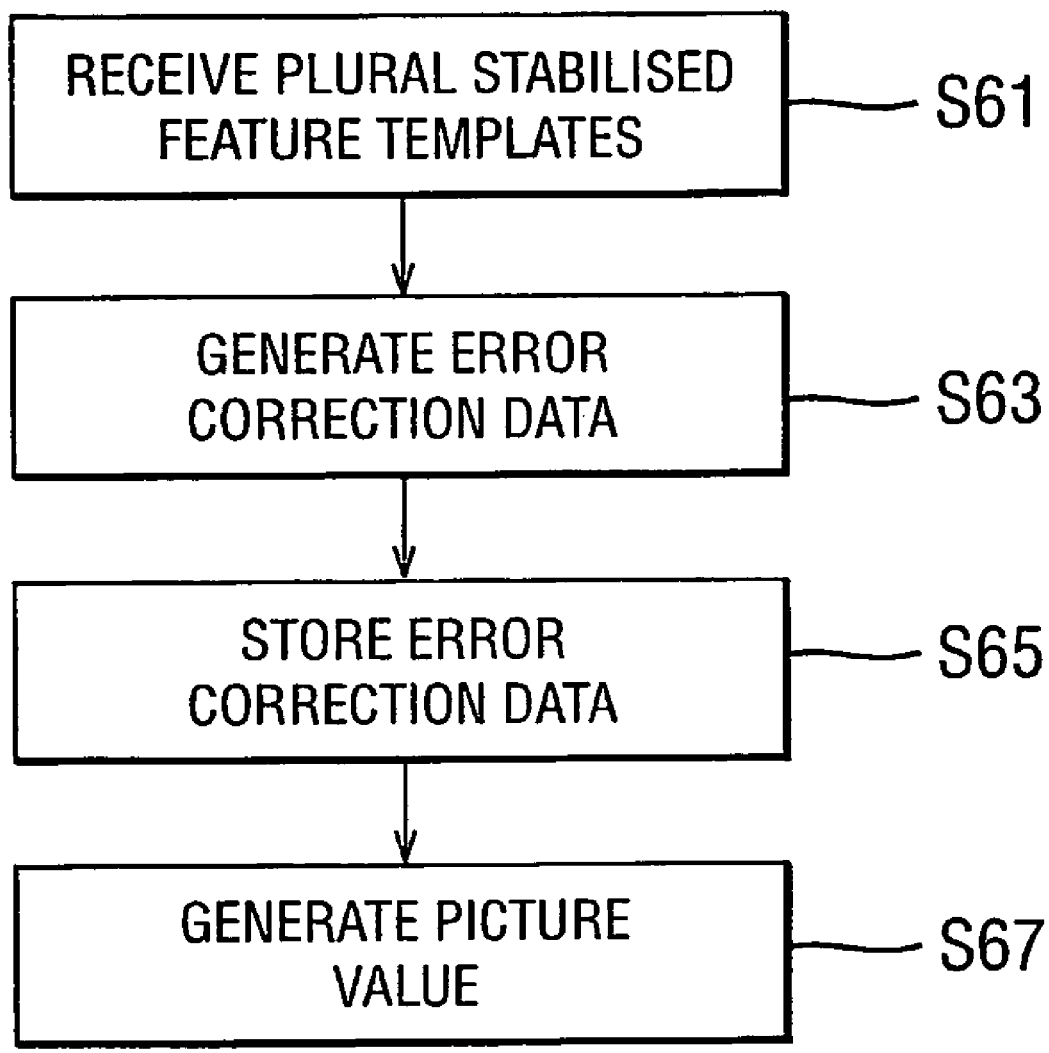

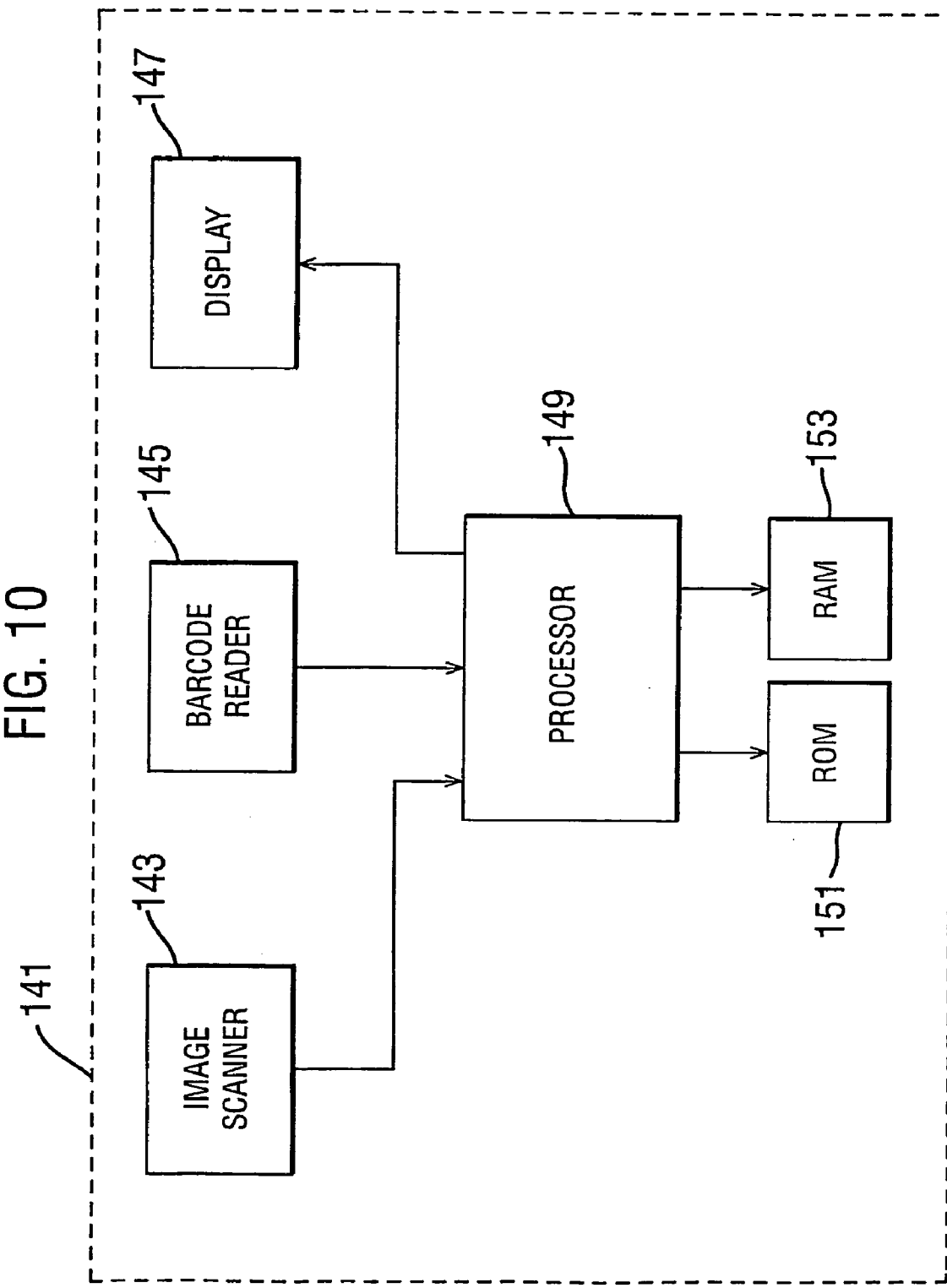

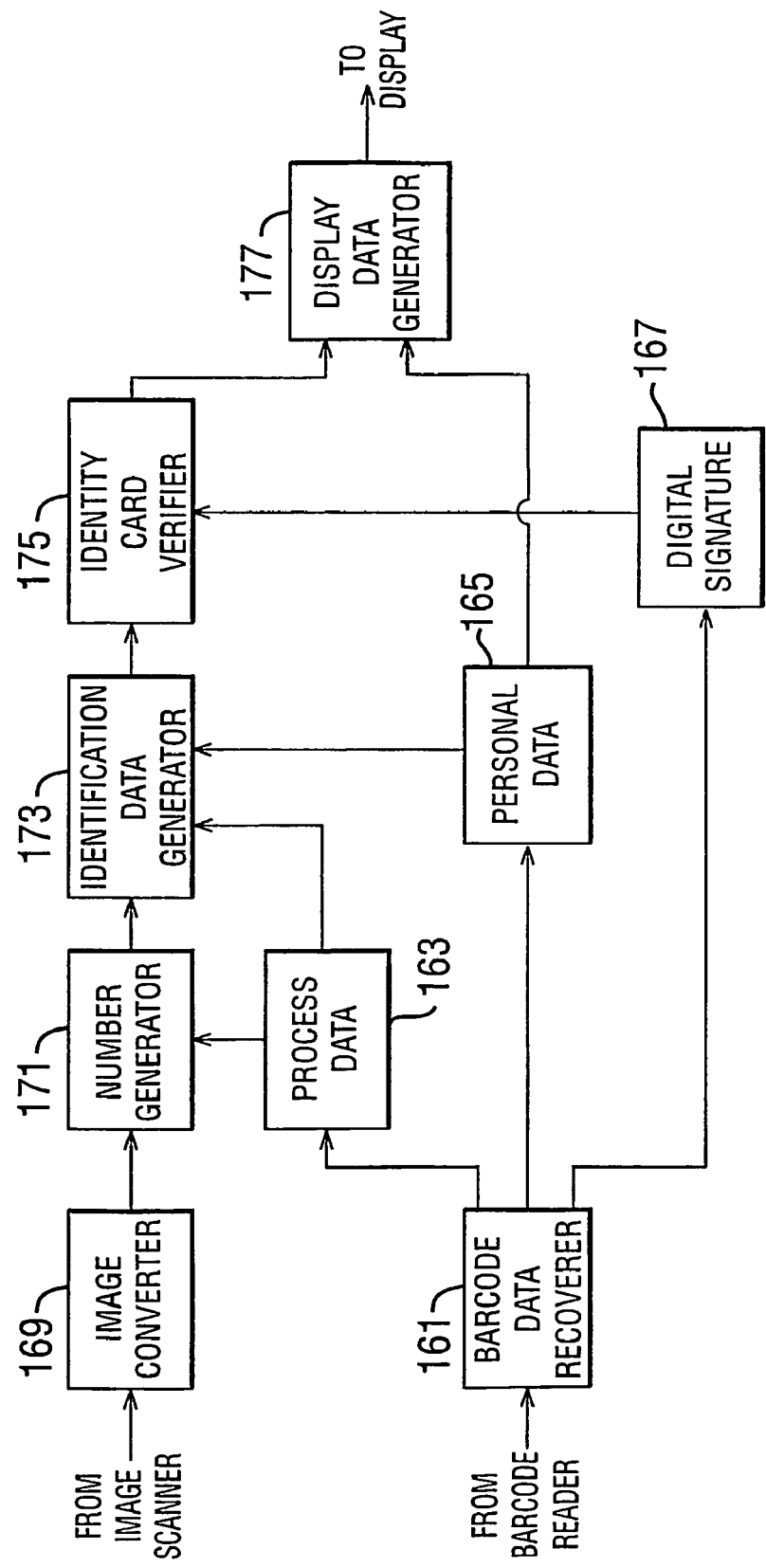

FIG. 22 VERIFICATION

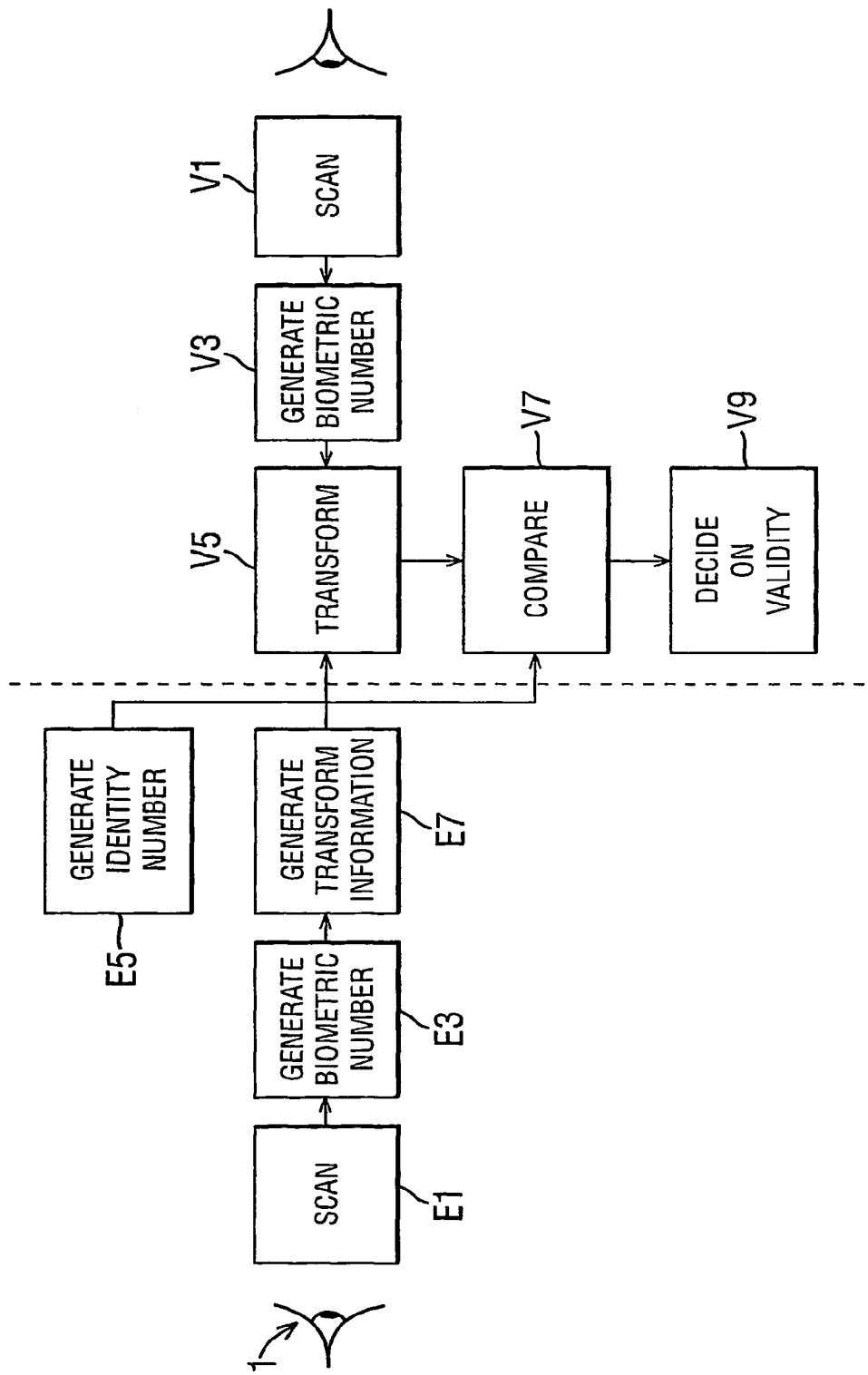

BIOMETRIC AUTHENTICATION SYSTEM

CROSS REFERENCE TO RELATED APPLICATIONS

This application is a national phase application based on PCT/GB03/02382, filed Jun. 2, 2003, and claims the priority of PCT/GB02/02512, filed May 31, 2002; Great Britain Application No. 0218898.5, filed Aug. 14, 2002; Great Britain Application No. 0228428.9, filed Dec. 5, 2002; and Great Britain Application No. 0311691.0, filed May 21, 2003, all of which are incorporated herein by reference.

This invention relates to a system for authenticating a subject, which may be either a living creature or an inanimate object. The invention has particular, but not exclusive, relevance to a personal identification system for verifying the identity of a human being.

Personal identification devices, such as passports and driving licences, typically include biographical information, such as the name and the date of birth, of an associated person. In order to hinder fraudulent use of the personal identification device, biometric information which is effectively representative of the associated person is also commonly stored on the personal identification device. For example, passports and, in many countries, driving licences include a picture of the associated person. As another example, credit cards generally have the signature of the associated person written thereon.

A problem with existing personal identification devices which include biometric data is that after the issuance of the personal identification device, fraudulent use is carried out by replacing the biometric data with biometric data for a different person. For example, if the biometric data is a picture, then the picture of the associated person is replaced by the picture of someone else.

An object of the present invention is to provide an authentication system which is less susceptible to fraudulent use.

According to an aspect of the invention, there is provided an authentication system in which during an enrolment process a distinctive characteristic of a subject being enrolled is measured to generate a reference number representative of the subject. Authentication data is then generated using the reference number, and the authentication data is stored for use in a subsequent verification process. During verification, the representative characteristic of the subject being verified is re-measured to generate a test number representative of the subject being verified, and the authentication data generated during enrolment is retrieved. The authentication system then checks for equality between the test number and the reference number using the retrieved authentication data. If the test number and the reference number are equal, then the authenticity of the subject is verified, otherwise the authenticity is denied.

As each time the physical characteristic of the subject is measured, there may be variations in the resulting physical data, preferably during enrolment variability correcting data is generated which is used during verification to increase the repeatability of the reference number. This variability correcting data may comprise ambiguity resolving data which is used to reduce the sensitivity of the reference number to variations in the physical data, and/or error correcting data which is used by an error detection and correction algorithm to correct errors in the number generated during the verification process.

If the subject being authenticated is a living creature, then the reference number can be derived from biometric data corresponding to a distinctive feature of the living creature. For example, the authentication data may be derived from an iris pattern, a retinal pattern or a fingerprint.

In an embodiment, the authentication data is derived from a picture of the subject which is provided on an identification device.

Embodiments of the invention will now be described with reference to the accompanying Figures, in which:

FIG. 1 shows an identity card used in an authentication system according to the invention;

FIG. 2 schematically shows a card manufacturing system for manufacturing the identity card illustrated in FIG. 1;

FIG. 3 schematically shows the main functional components of a processing system which forms part of the manufacturing system illustrated in FIG. 2;

FIG. 4 shows the main components of a number generator and a process data generator which form part of the processing system illustrated in FIG. 3;

FIG. 5 schematically shows the main components of a feature template generator, an attribute value stabilizer and an ambiguity resolution vector generator which form part of the number generator and the process data generator illustrated in FIG. 4;

FIG. 7 is a flow diagram showing operations performed by the attribute value stabilizer illustrated in FIG. 4;

FIG. 9 is a flow chart showing operations performed by a picture value generator which is illustrated in FIG. 4;

FIG. 10 is a schematic diagram showing the main components of a card reader for reading the identity card illustrated in FIG. 1;

Figure 12:
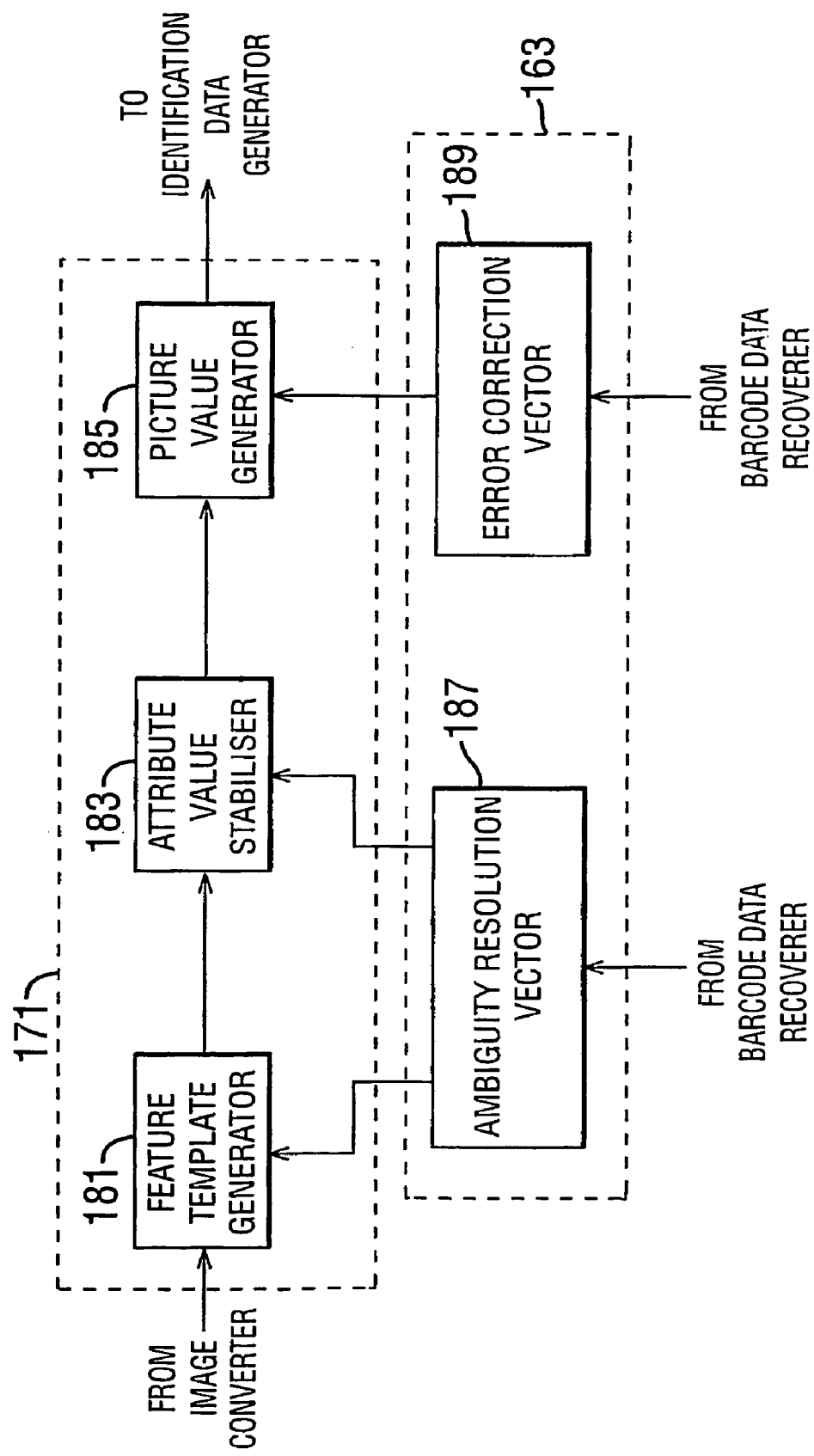
Figure 13:
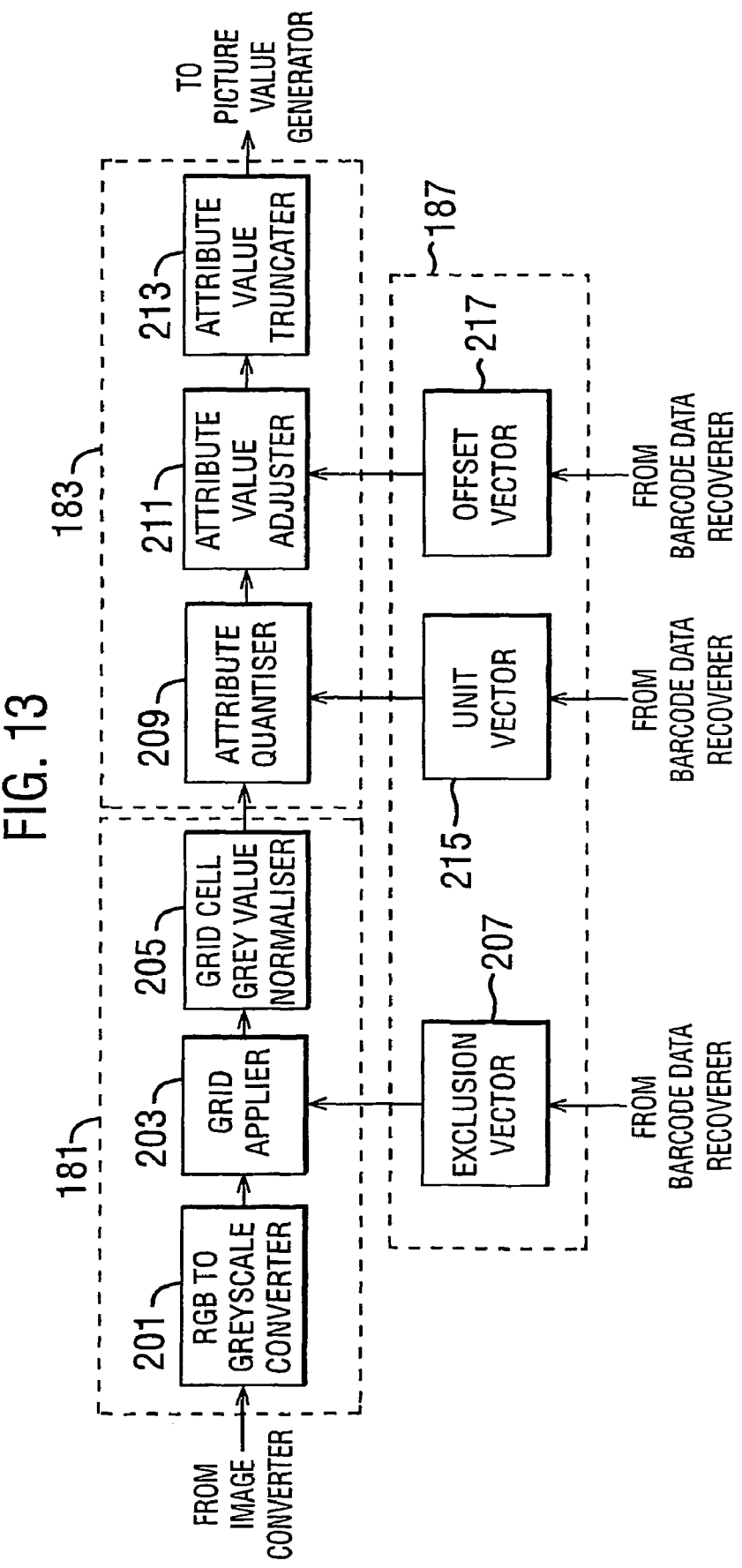
Figure 14:
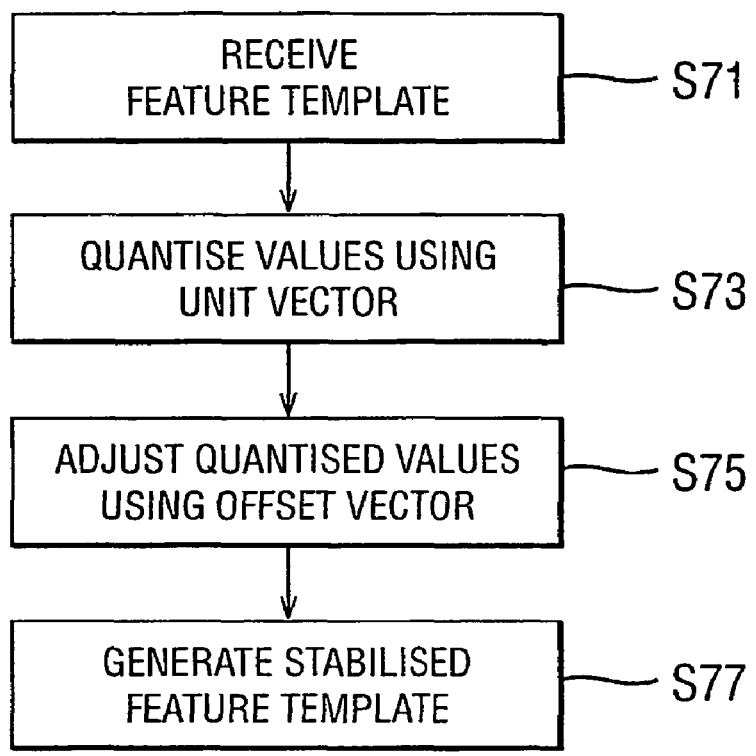
Figure 15:
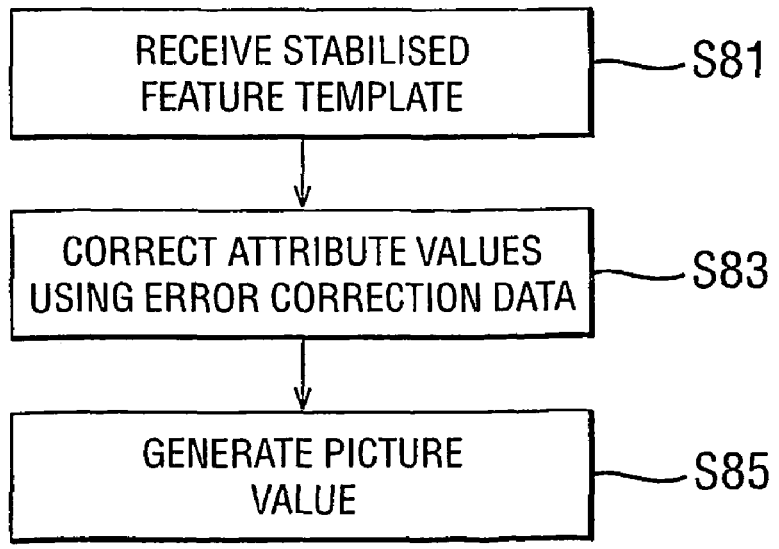
Figure 16:
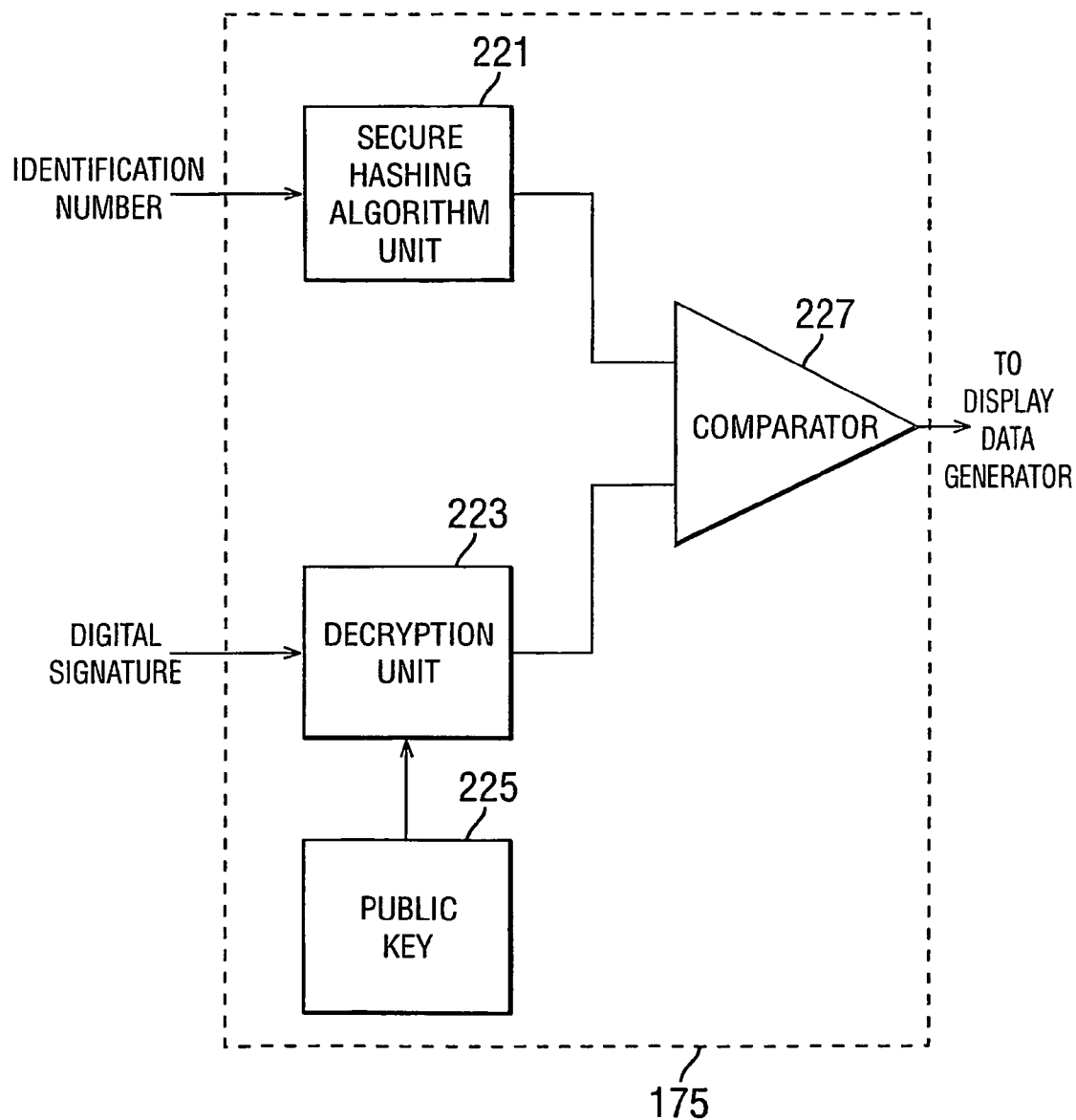
Figure 17:
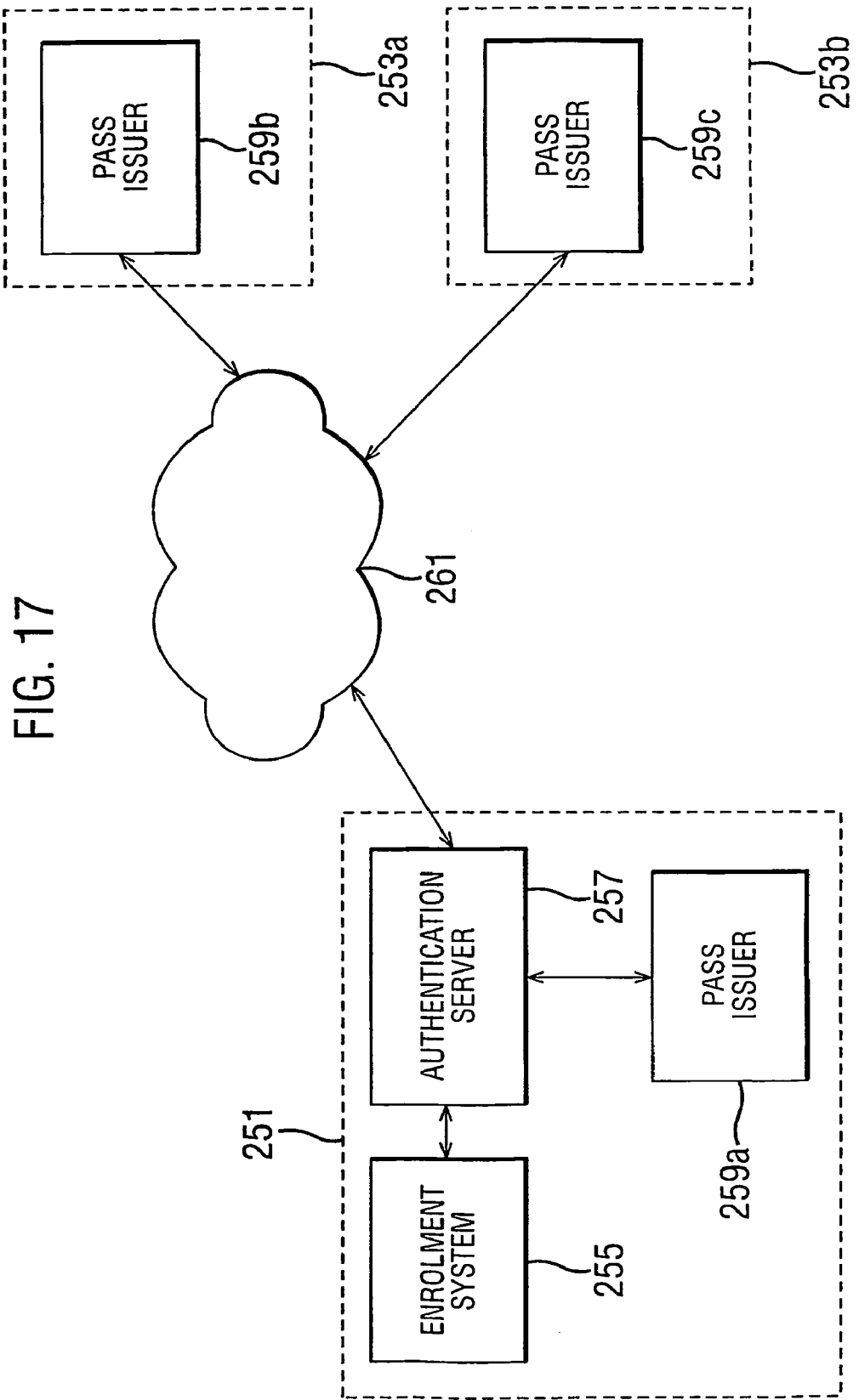
Figure 18:
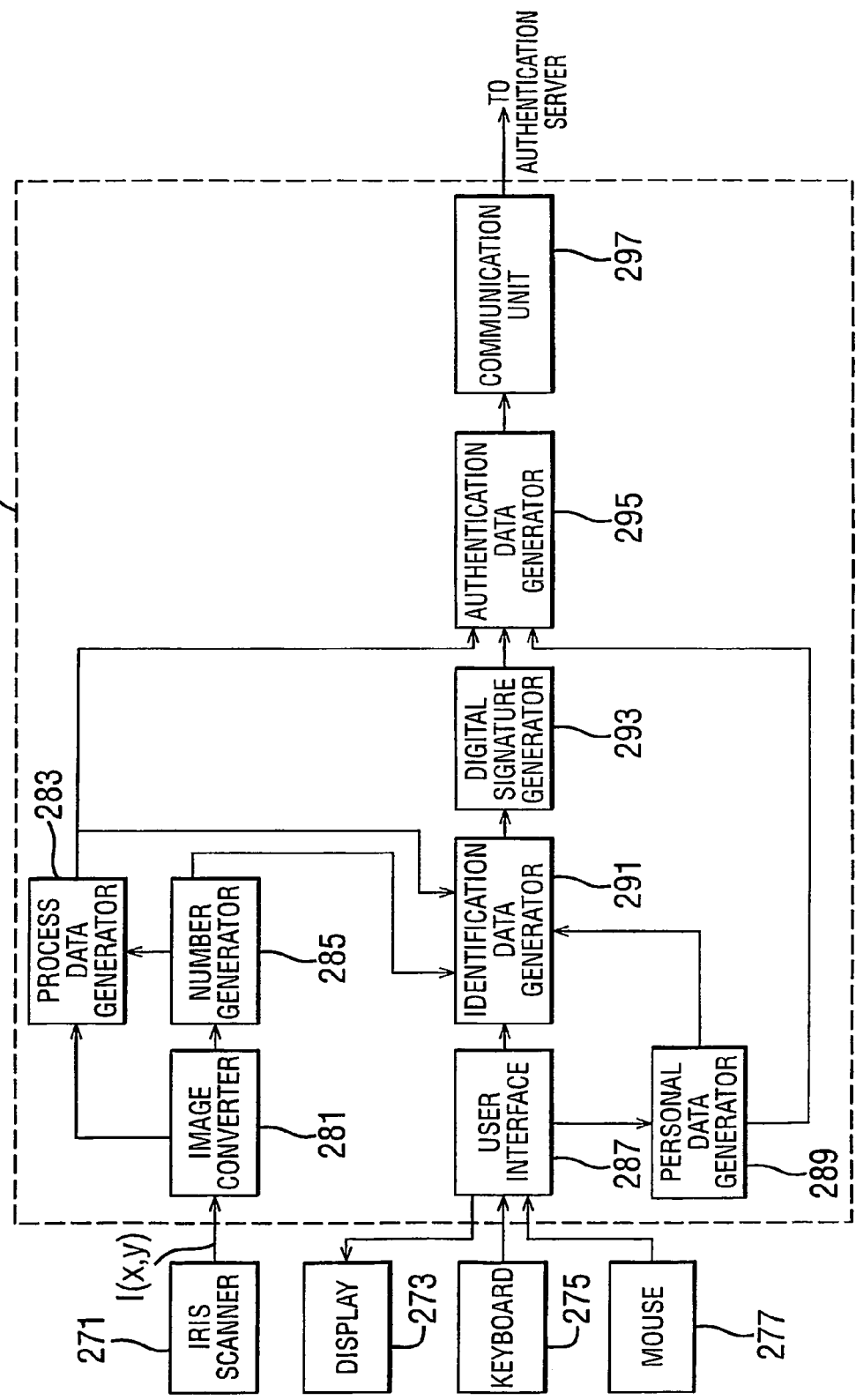
Figure 19:
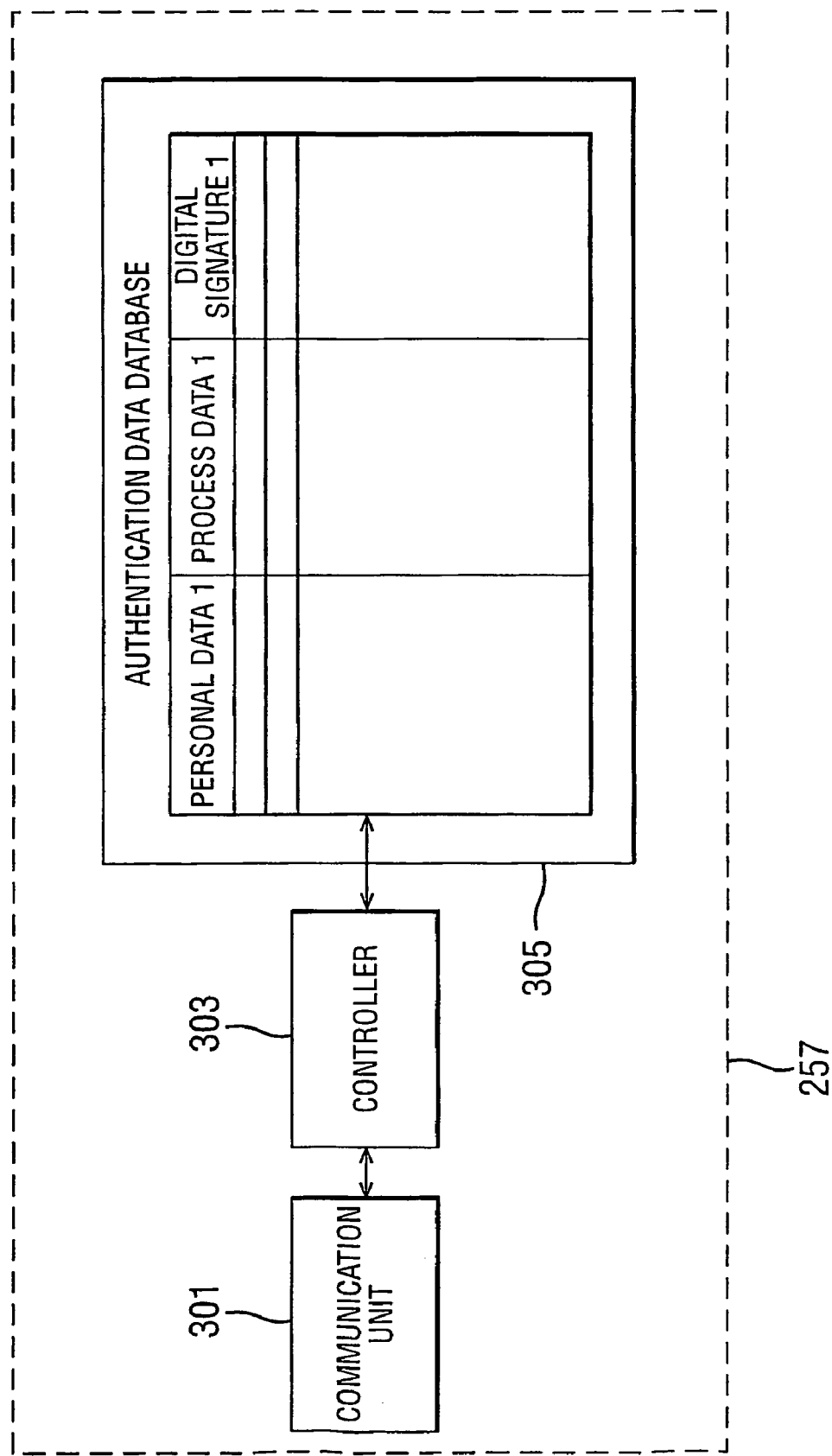
Figure 20:
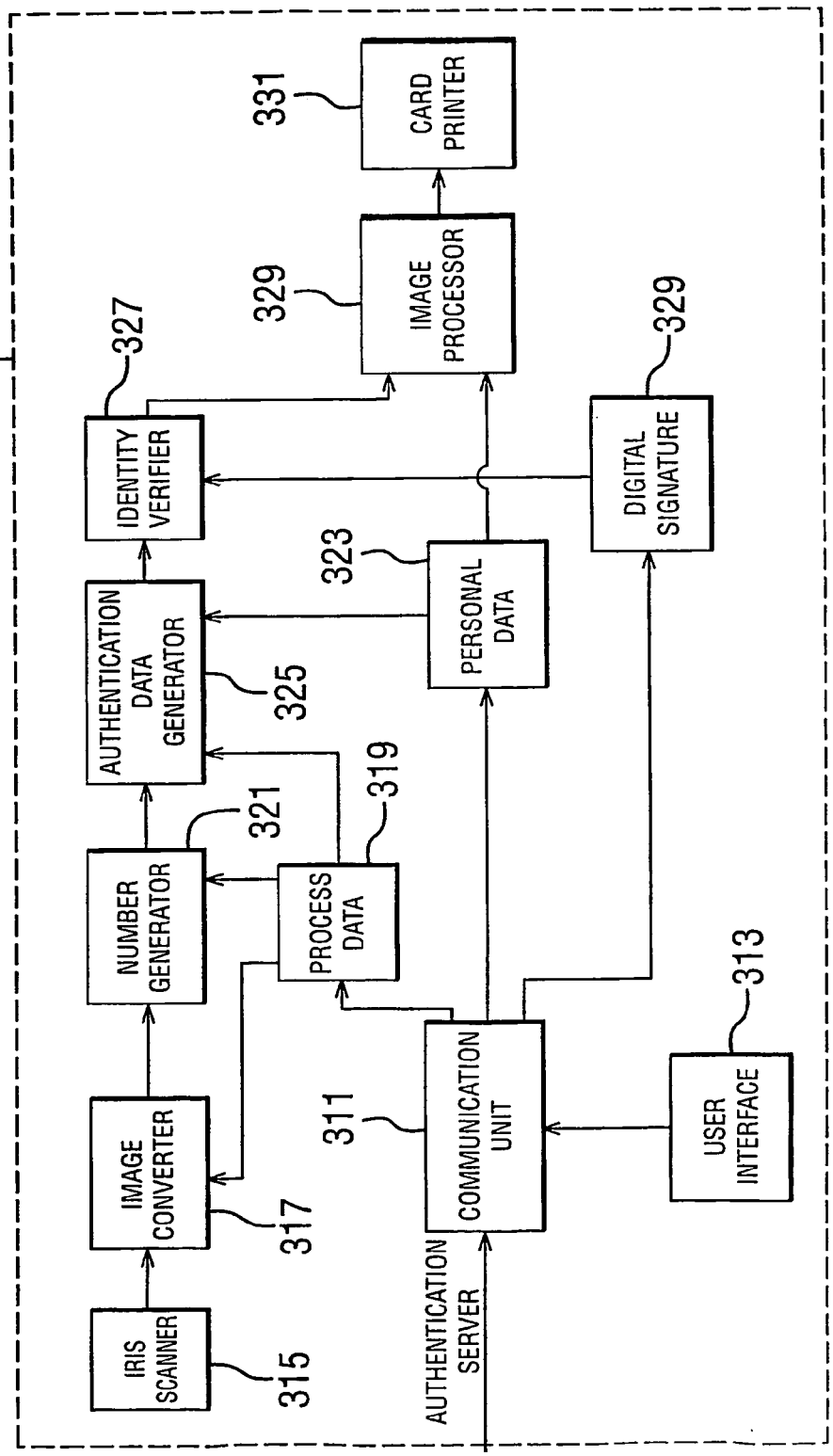
Figure 21:
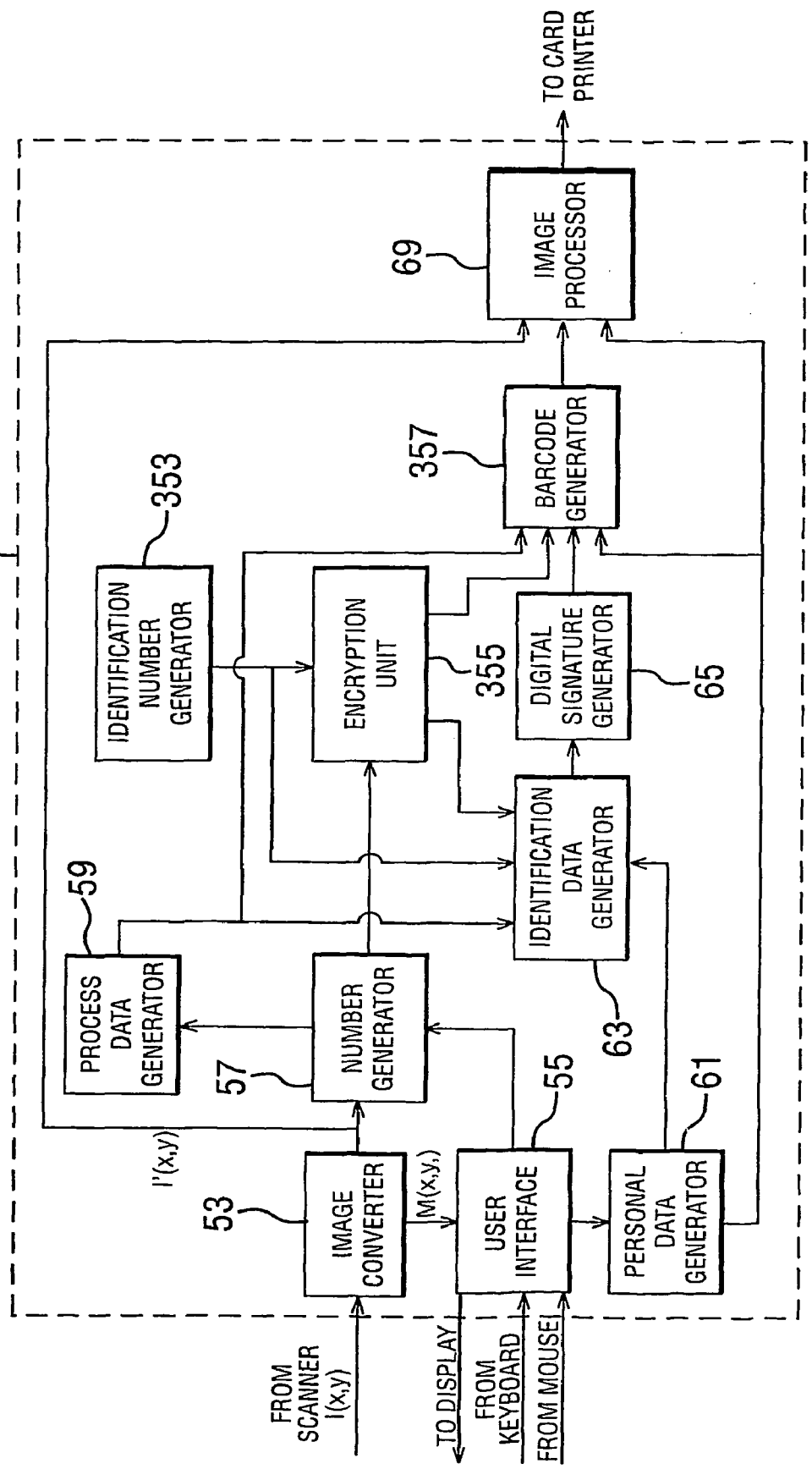
Figure 22:
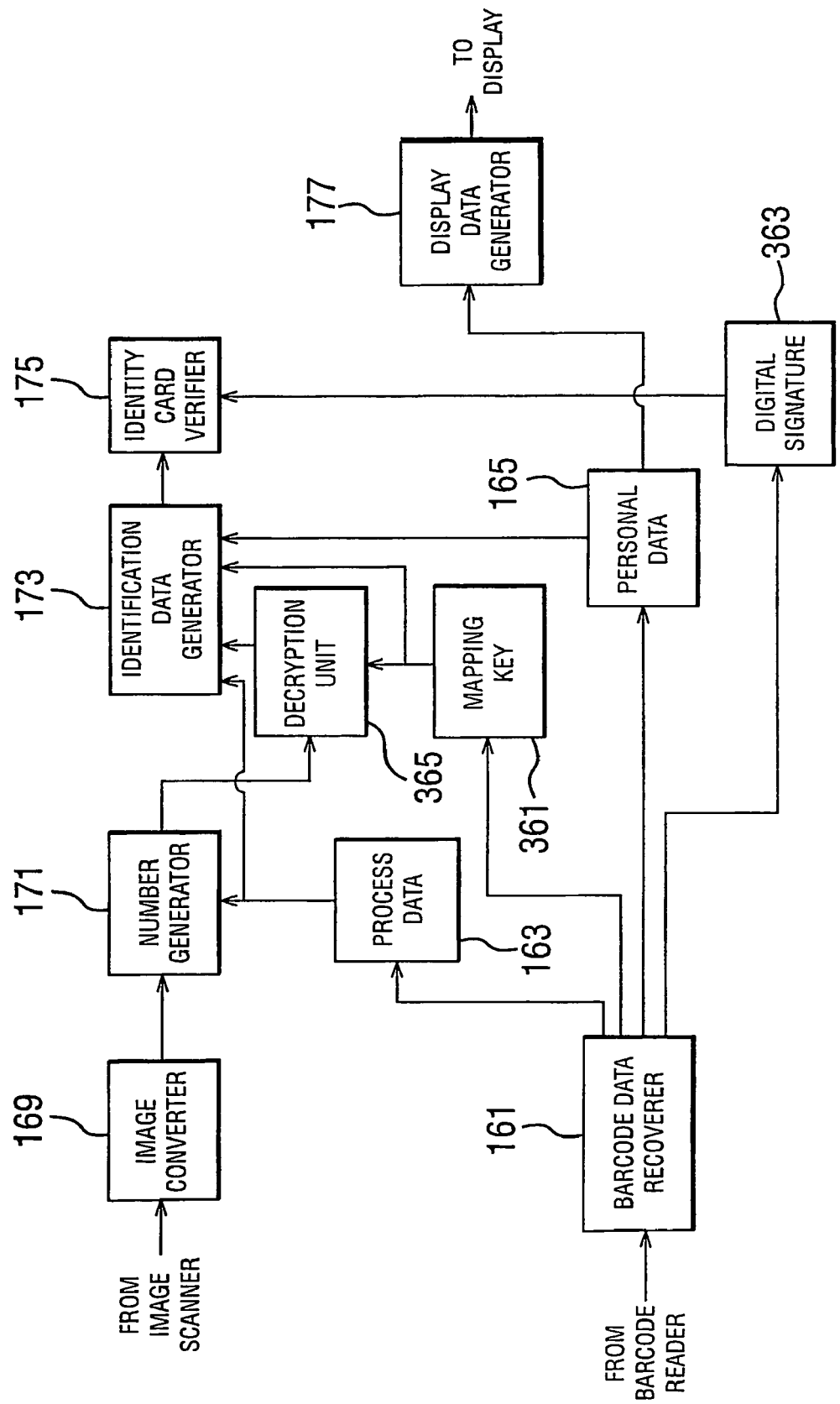
Figure 23:
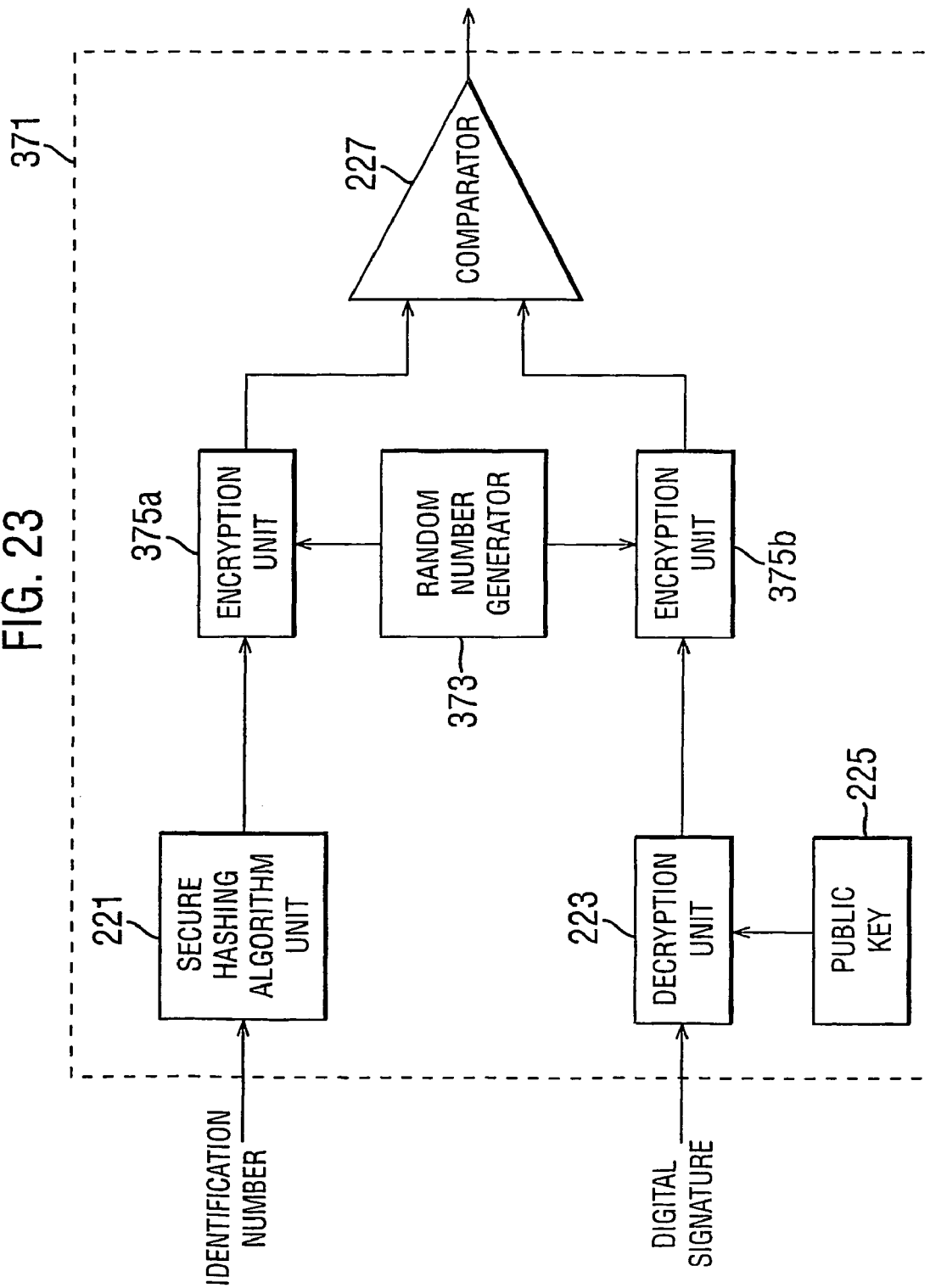

FIG. 11 schematically shows the main functional components of a processing system forming part of the reader illustrated in FIG. 10;

FIG. 12 schematically shows the main components of a number generator which forms part of the processing system illustrated in FIG. 11;

FIG. 13 schematically shows the main components of a feature template generator and a attribute value stabilizer which form part of the number generator illustrated in FIG. 12;

FIG. 14 is a flow chart showing operations performed by a grid applier and grid cell grey value normaliser which form part of the feature template generator illustrated in FIG. 13;

FIG. 15 is a flow chart showing operations performed by a picture value generator which forms part of the number generator illustrated in FIG. 12;

FIG. 16 shows the main components of an identity card verifier which form part of the processing system illustrated in FIG. 11;

FIG. 17 schematically shows a first alternative authentication system to the authentication system illustrated in FIGS. 1 to 16;

FIG. 18 schematically shows the main components of an enrolment system forming part of the authentication system illustrated in FIG. 17;

FIG. 19 schematically shows the main components of an authentication server forming part of the authentication system illustrated in FIG. 17;

FIG. 20 schematically shows the main components of a pass issuer forming part of the authentication system illustrate in FIG. 17;

FIG. 21 schematically shows the main functional components of a processing system which forms part of a card manufacturing system of a second alternative authentication system;

FIG. 22 schematically shows the main functional components of a processing system forming part of a card reader of the second alternative authentication system;

FIG. 23 schematically shows the main components of an alternative identity card verifier to the identity card verifier illustrated in FIG. 16; and FIG. 24 schematically illustrates an authentication system in which each object identified is assigned an identity number.

FIRST EMBODIMENT

Overview

Figure 1:
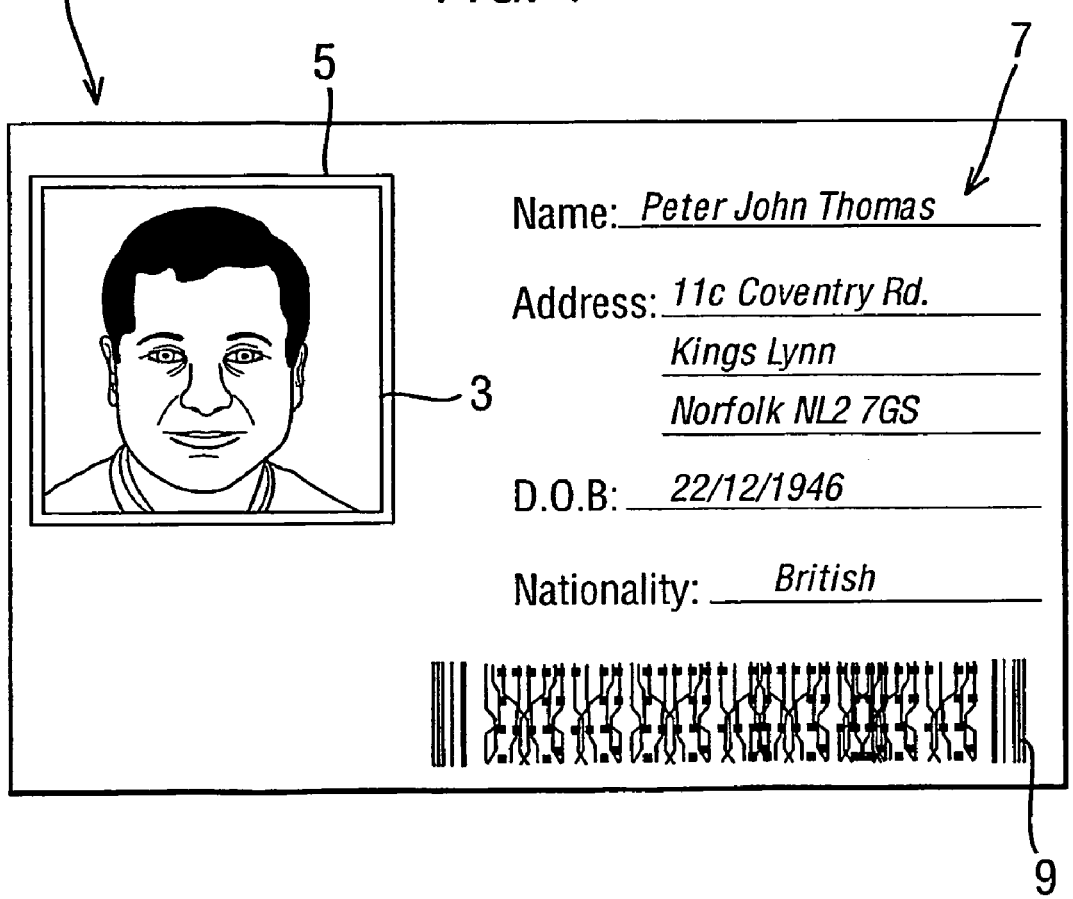

FIG. 1 shows an identity card 1, which is used in an authentication system according to the present invention. The identity card 1 includes a picture 3, positioned within a frame 5, of an associated person and written personal details 7 (in this embodiment the name, address, date of birth and nationality) for that associated person. The identity card 1 also includes a barcode 9 which, as will be explained in more detail hereafter, contains authentication data enabling a card reader to verify that the written personal details 7 are for the person shown in the picture 3.

The identity card 1 is manufactured by a card issuer using a card manufacturing system. Once the identity card 1 has been issued, the associated person uses the identity card 1 to prove their identity or age to a third party. In particular, the third party uses a card reader to:

(a) verify that the identity card 1 was issued by the card issuer;
(b) check that the written personal details 7 on the identity card 1 have not been tampered with; and
(c) verify that the picture 3 on the identity card 1 has not been tampered with.

The card manufacturing system and the card reader will now be described in detail.

Card Manufacturing System

Figure 2:
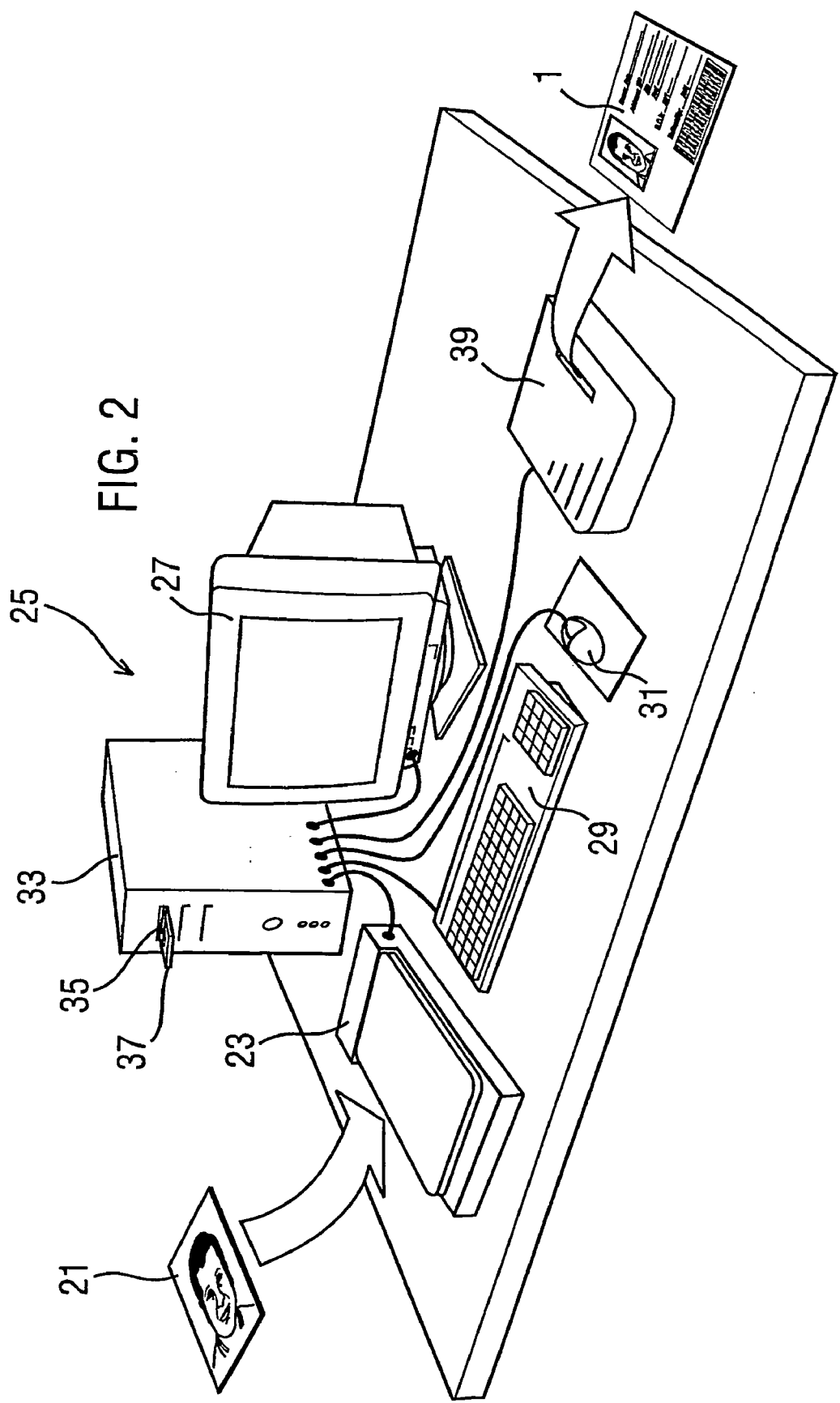

FIG. 2 is a schematic perspective view of the card manufacturing system used by the card issuer. As shown, a photograph 21 is placed in a scanner 23 which scans the photograph to generate corresponding electronic image data I(x,y). The scanner 23 is connected to a computer system 25 which includes a display 27, a keyboard 29, a mouse 31 and a computer tower 33 housing processing electronics and having a slot 35 for receiving a floppy disk 37. The computer system 25 is also connected to a card printer 39 which prints the identity card 1.

Figure 3:
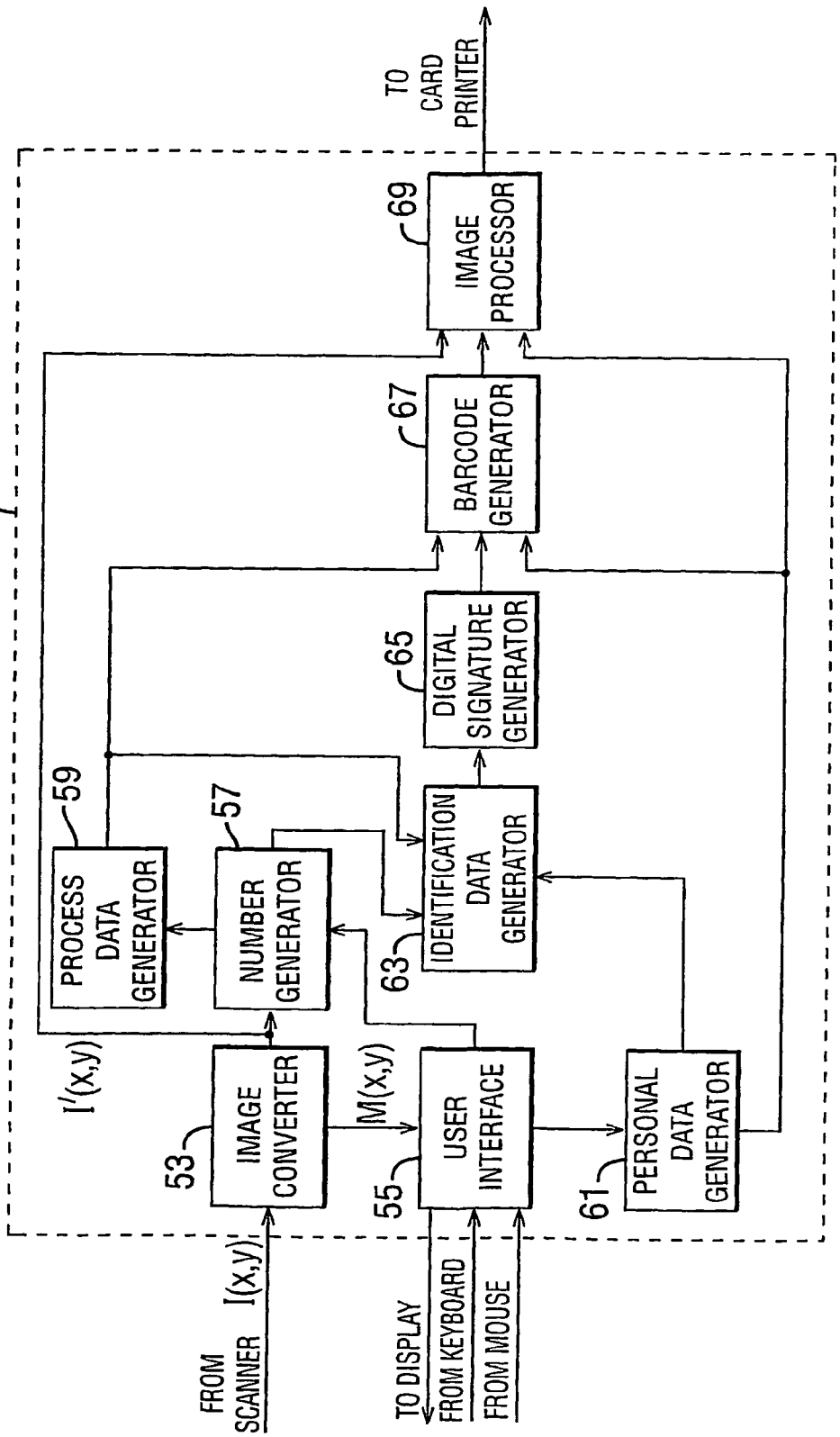

FIG. 3 schematically shows the main functional components of a processing system 51 included within the computer system 25. As shown, when the photograph 21 is scanned by the scanner 23, the image data I(x,y) corresponding to the photograph 21 is input to an image converter 53 which transforms the image data into a coordinate system having an origin located at the bottom left hand corner (as shown in FIG. 1) of the frame 5 and X and Y axes formed in horizontal and vertical directions respectively (as shown in FIG. 1). The scanner 23 performs multiple scans of the photograph 21 and the transformed image data I'(x,y) for the multiple scans is input to a number generator 57 which, as will be described in more detail hereafter, generates a picture value representative of the photograph 21.

In this embodiment, the image converter 53 also modifies the transformed image data I'(x,y) for the first scan of the photograph to superimpose a grid of cells, hereafter called macro-cells, having ten rows and eight columns. The image converter 53 sends the modified image data M(x,y) to a user interface 55 which causes the display 27 to show an image corresponding to the modified image data M(x,y). The user interface 55 also enables an operator of the card manufacturing system to select, using the mouse 31, the sixteen macro-cells which appear most distinctive of the person shown in the photograph 21. Typically, these macro-cells contain characteristic facial features (such as the mouth, nose, eyes and ears) of the person pictured in the photograph 21. The user interface 55 sends data identifying the selected macro-cells to the number generator 57, which only uses the portions of the transformed image data corresponding to the selected macro-cells to generate the picture number.

The number generator 57 is connected to a process data generator 59 which generates process data for inclusion in the barcode 9. The process data contains information relating to how the picture value was calculated by the card manufacturing system. The generated process data is used in subsequent card reading operations to increase the likelihood that the same picture value is determined. The reason why only selected parts of the image data (i.e. the parts corresponding to selected macro-cells) are used to generate the picture value is so that the picture value is more closely associated with the person shown in the photograph 21. Further, as will become apparent, this reduces the amount of data which is stored in the barcode 9. This is advantageous because the barcode 9 is only able to store a limited amount of data.

The operator of the card manufacturing system also inputs, using the keyboard 29, personal details relating to the person shown in the photograph 21 to the user interface 55, which forwards the personal details to a personal data generator 61 which generates personal data containing the personal details. The personal data generated by the personal data generator 61, the picture value output by the number generator 57 and the process data output by the process data generator 59 are input to an identification data generator 63, where they are combined to form identification data. In this embodiment, this combination consists of concatenating the personal data, the picture value and the process data.

The identification data is input to a digital signature generator 65 which performs a secure hashing algorithm on the identification data to generate a one-way hash. As those skilled in the art will appreciate, a secure hashing algorithm has a deterministic output (i.e. the same output data is always generated for the same input data), but the input data cannot be derived from the output data (hence it is a one-way algorithm). The one-way hash is encrypted using a private encryption key $K_{pri}$, generated using the RSA algorithm, associated with the card issuer to generate a digital signature.

The process data generated by the process data generator 59, the personal data generated by the personal data generator 61 and the digital signature generated by the digital signature generator 65 form the authentication data and are input to a barcode generator 67 which generates barcode data for the barcode 9. The picture value is not, however, included in the authentication data in order to hinder counterfeiting of the identity card 1. In this embodiment, the barcode generator 67 generates barcode data for a PDF417 two-dimensional barcode.

The transformed image data I'(x,y) output by the image converter 53, the personal data output by the personal data generator 61 and the barcode data output by the barcode generator 67 are input to an image processor 69 which generates image data for the identity card 1. The image processor 69 outputs the image data for the identity card 1 to the card printer 39.

The manner in which the number generator 57 generates the picture value will now be described in more detail with reference to FIGS. 4 to 9.

Figure 4:
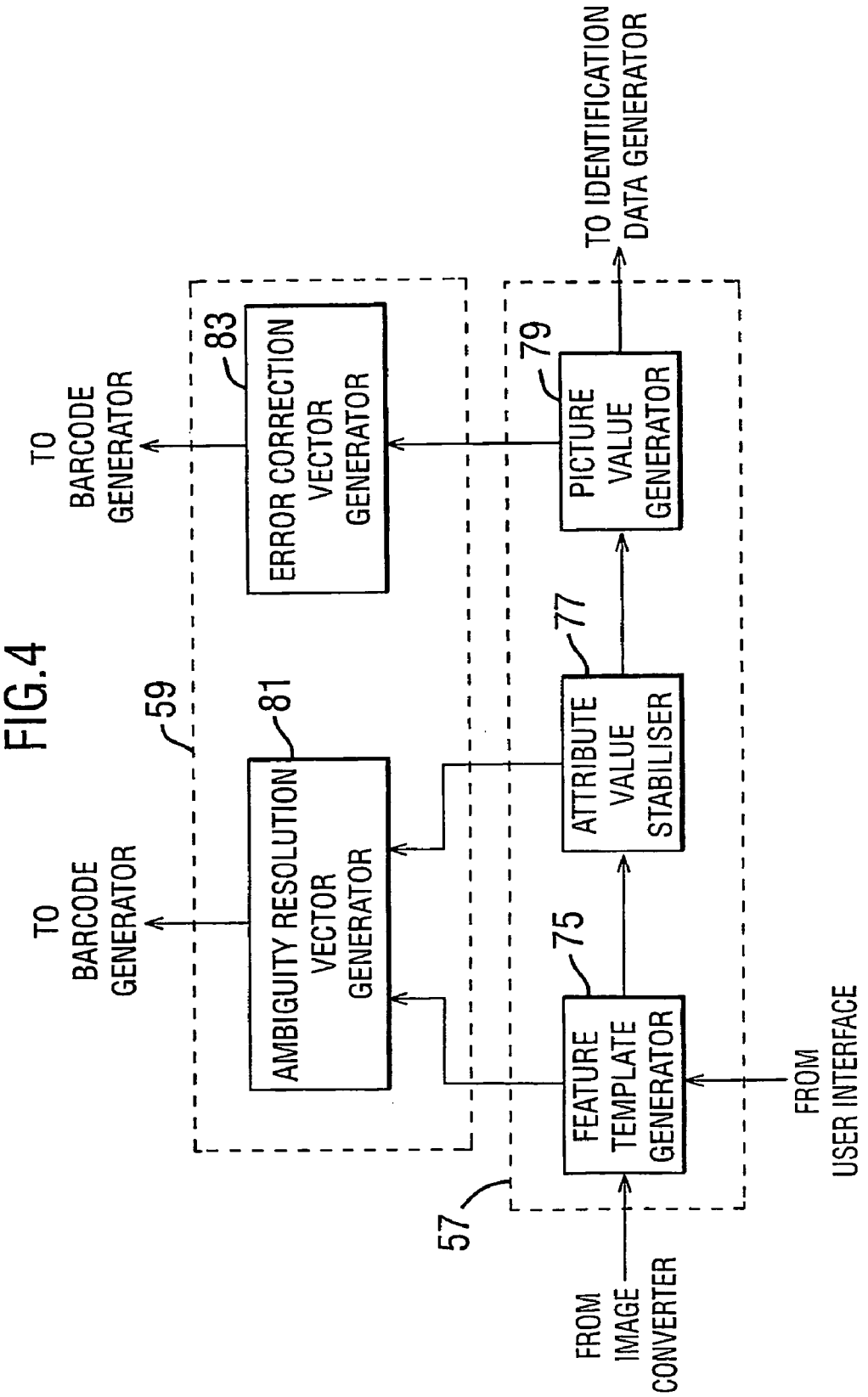

As shown in FIG. 4, the number generator 57 includes a feature template generator 75, an attribute value stabiliser 77 and a picture value generator 79. The transformed image data I'(x,y) for each scan of the photograph 21 is input to the feature template generator 75 which generates a corresponding feature template corresponding to the transformed image data I'(x,y). A feature template is a collection of image artifacts within the image data, hereafter referred to as features, with each feature having a number of properties, hereafter called attributes, which each have an associated attribute value.

The feature templates generated for multiple scans of the photograph 21 by the feature template generator 75 are input to an attribute value stabiliser 77, which processes the attribute values of the feature templates and outputs a stabilised feature template. In this embodiment, the feature template generator 75 and the attribute value stabiliser 77 output data to an ambiguity resolution vector generator 81 which forms part of the process data generator 59. The ambiguity resolution vector generator 81 generates an ambiguity resolution vector which is used in a subsequent card reading operation to improve the likelihood of recovering the same stabilised feature template.

The operation of the feature template generator 75, attribute value stabiliser 77 and ambiguity resolution vector generator 81 will now be described in more detail with reference to FIGS. 5 to 8.

Figure 5:
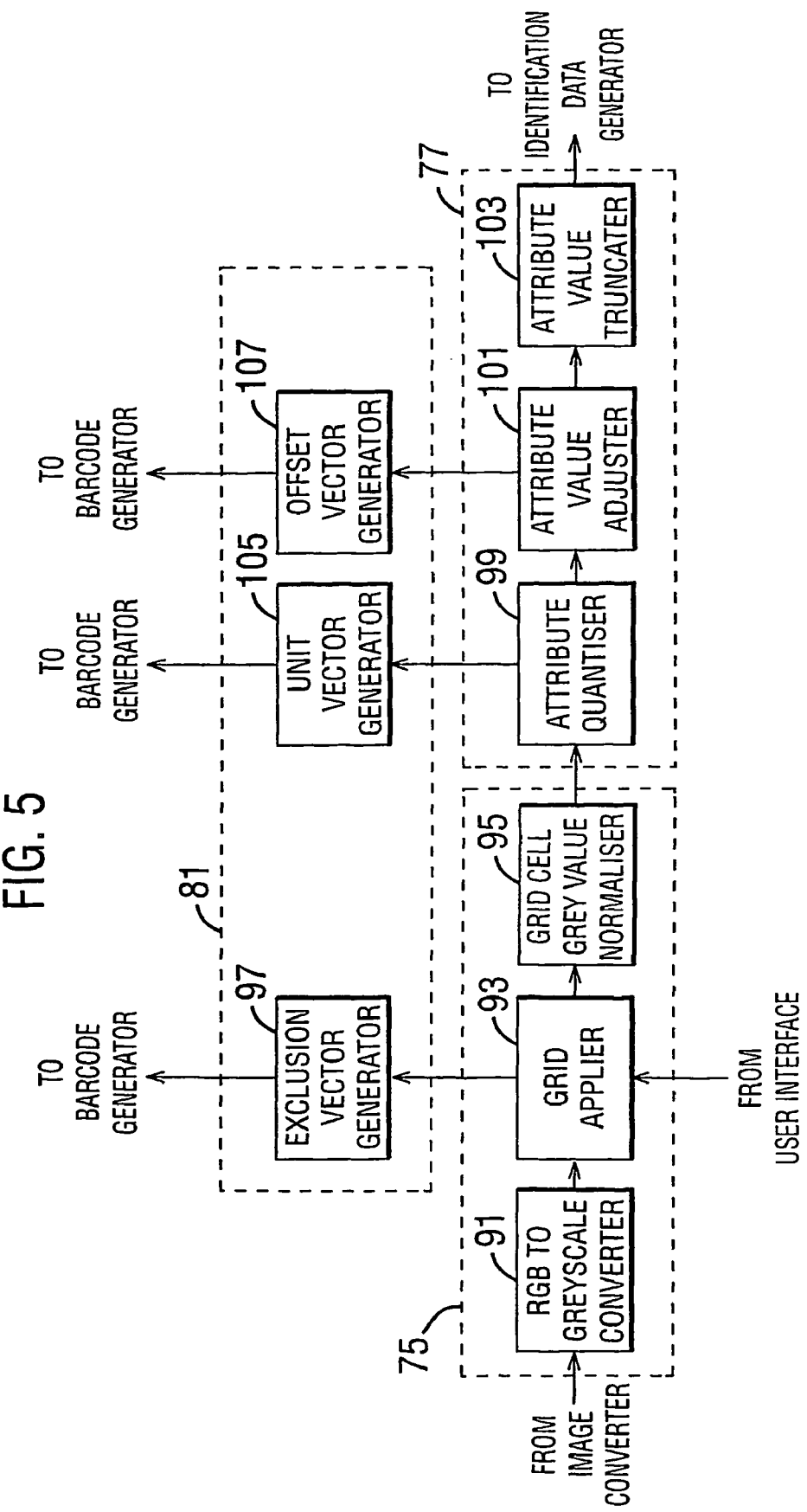

As shown in FIG. 5, the feature template generator 75 includes an RGB to greyscale converter 91 which converts the transformed image data I'(x,y) for each scan of the photograph 21 into greyscale data. The RGB to greyscale converter 91 sends the generated greyscale data to a grid applier 93, which applies a grid of cells, hereafter called grid cells in order to distinguish from the macro-cells previously described, having forty rows and thirty-two columns to the transformed image data I'(x,y). The grid applier 93 is connected to a grid cell grey value normaliser 95 which generates a normalised grey value for each grid cell. The grid applier 93 is also connected to the user interface 55, from which it receives data identifying the excluded macro-cells, and to an exclusion vector generator 97, forming part of the ambiguity resolution vector generator 81, which generates an exclusion vector identifying the excluded macro-cells. The operations performed by the grid applier 93 and the grid cell grey value normaliser are summarised in FIG. 6.

Figure 6:
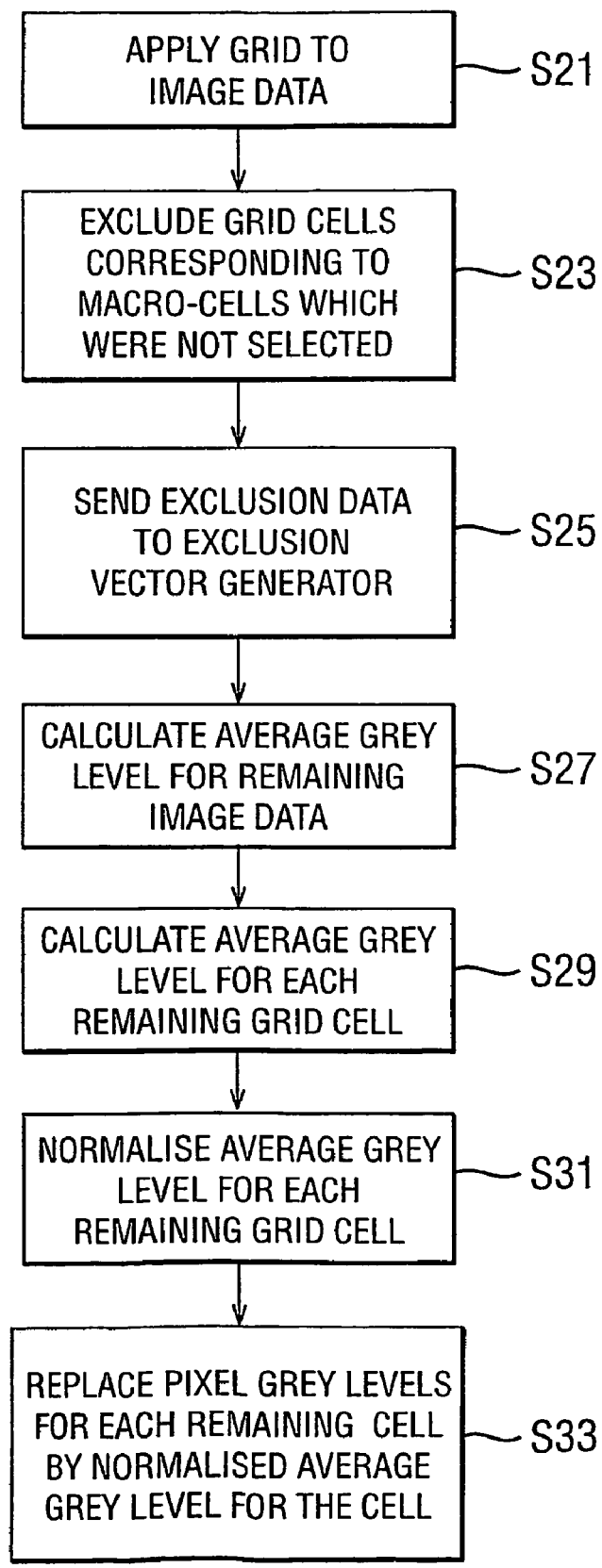
FIG. 6 is a flow chart showing operations performed by a grid applier and a grid cell grey value normaliser which form part of the feature template generator illustrated in FIG. 5.

As shown in FIG. 6, the grid applier 93 applies, in step S21, the grid to the transformed image data I'(x,y). In this embodiment, the transformed image data is a 400 by 320 array of pixels so that each grid cell encompasses a ten-by-ten block of pixels. The grid applier 93 excludes, in step S23, grid cells which do not correspond to a selected macro-cell using the signal received from the user interface 55. The grid applier 93 then sends, in step S25, exclusion data identifying the excluded macro-cells to the exclusion vector generator 97, which generates an exclusion vector having eighty bits (one for each macro-cell) of information, with the bit value "1" indicating macro-cells to be excluded and the bit value "0" indicating macro-cells to be included.

The grid cell grey value normaliser 95 then calculates, in step S27, a total average grey level $G_{image}$ by calculating the mean grey level for all the pixels of the remaining grid cells (i.e. the grid cells corresponding to selected macro-cells) of the transformed image data I'(t). The grid cell grey value normaliser 95 then calculates, in step S29, an average grey level for each remaining grid cell by calculating the mean grey level $G_{cell}$, for the 100 pixels forming the grid cell, and normalises, in step S31, the average grey level for each remaining grid cell by dividing the mean grey level $G_{cell}$ for the grid cell by the average grey level $G_{image}$ for the image. The grid cell grey value normaliser 95 then replaces, in step S33, the one hundred individual pixel grey levels in each remaining grid cell by the normalised average grey level for the grid cell.

The feature template input to the attribute value stabiliser therefore comprises two hundred and fifty-six features (i.e. the remaining grid cells) each having an attribute (i.e. the grey level) with an associated attribute value (i.e. the normalised average grey level value).

Returning to FIG. 5, the attribute value stabiliser 77 includes an attribute quantiser 99, which re-scales the normalised average grey level values, an attribute value adjuster 101, which adjusts each re-scaled normalised grey level value so that it is positioned in a region midway between two neighbouring integer values, and an attribute value truncator 103, which truncates the adjusted normalised grey level value to an integer value. The attribute quantiser 99 is connected to a unit vector generator 105, forming part of the ambiguity resolution vector generator 81, which generates a unit vector identifying the units for the re-scaled normalised average grey level values. The attribute value adjuster 101 is connected to an offset vector generator 107, forming part of the ambiguity resolution vector generator 81, which generates an offset vector indicating offset values used to adjust the re-scaled normalised grey level values. The operations performed by the attribute value stabiliser 77 are summarised in FIG. 7.

As shown in FIG. 7, after receiving, in step S41, multiple feature templates for respective different scans of the photograph 21, the attribute quantiser 99 calculates, in step S43, a mean feature template by calculating the mean normalised grey level value for each remaining grid cell. The attribute quantiser 99 then calculates, in step S45, the median value of the normalised grey levels for the mean feature template, i.e. half the cells of the mean feature template have a normalised grey level above the median value and half the cells of the mean feature template have a normalised grey level below the median value.

The attribute quantiser 99 then calculates, in step S47, a unit value using the calculated median value. In this embodiment, the unit size is set to half the calculated median value. The attribute quantiser 99 then re-scales, in step S49, the average grey level for each cell as a multiple of the unit value to form a quantised feature template, and sends the unit value to the unit vector generator 105. In this embodiment, the same unit value is applied to each normalised grey level.

The quantised feature template is then input to the attribute value adjuster 101. In this embodiment, the attribute value adjuster 101 calculates, in step S51, an offset amount for each grid cell which, when added to the average grey level for the grid cell, moves the average grey level to a region midway between neighbouring integer multiples of the unit value. In this embodiment, the attribute value adjuster 101 selects one of three different offset amounts depending upon the value of the average grey level, with each offset amount corresponding to a respective offset value as set out in Table 1.

TABLE 1

Equivalence between offset values and offset amounts.

| OFFSET VALUE | OFFSET AMOUNT |
|---|---|
| 0 | −0.33 |
| 1 | 0 |
| 2 | 0.33 |

Figure 8A:
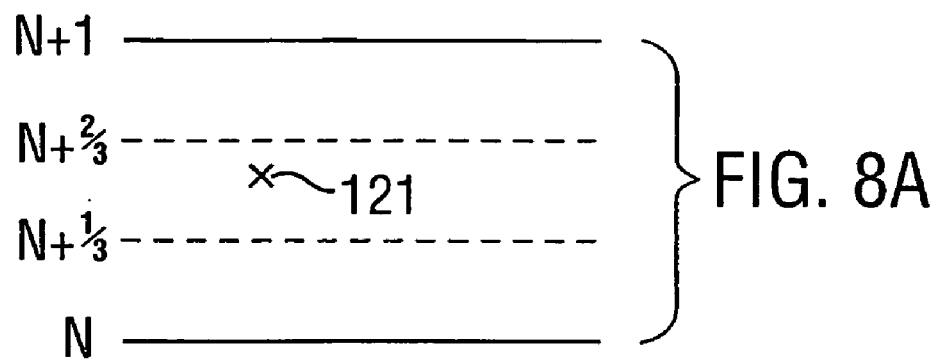
FIGS. 8A to 8C are schematic diagrams illustrating how the attribute value stabilizer illustrated in FIG. 4 uses offset values to stabilize a number generated by the number generator.
Figure 8B:
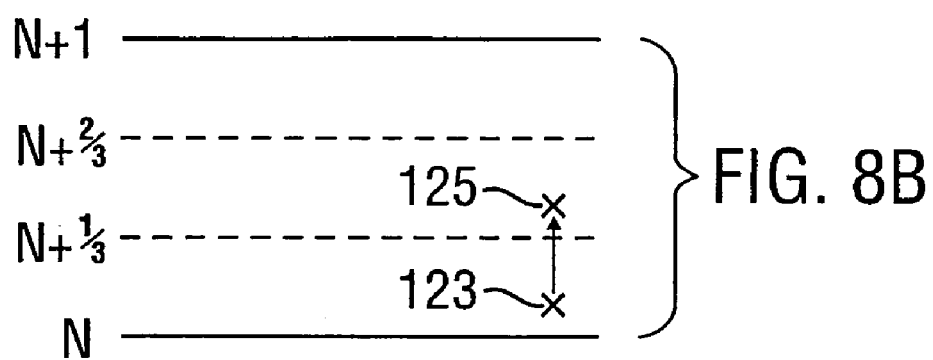
Figure 8C:
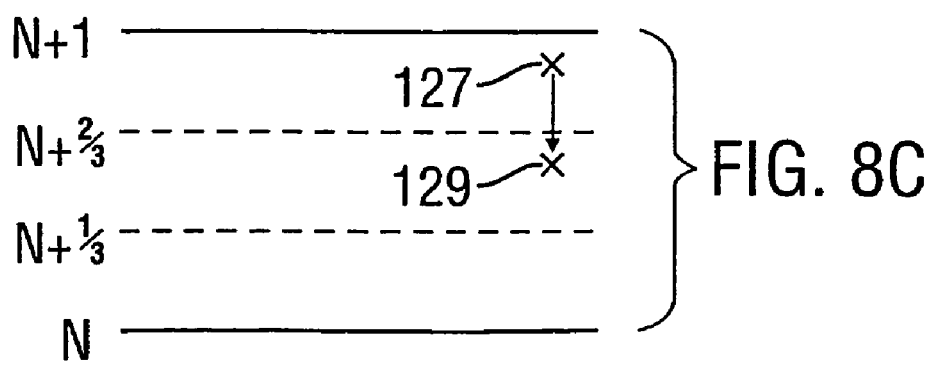

In particular, if the average grey level for a grid cell falls between (N+⅓), where N is any integer value, and (N+⅔), as shown in FIG. 8A for the value 121, then the offset value is set to 1 and the normalised grey level value is not adjusted. If the normalised grey level value falls between N and (N+⅓), as shown in FIG. 8B for the value 123, then the offset value is set to 2 and the normalised grey level value is adjusted by adding the offset amount of 0.33 to generate an adjusted value 125 having a value in the range from (N+⅓) and the (N+⅔). If the normalised grey level has a value between (N+⅔) and (N+1), as shown in FIG. 8C for the value 127, then the offset value is set to 0 and the normalised grey level value is adjusted by adding the offset amount of −0.33 to generate an adjusted normalised grey level value 129 falling in the range between (N+⅓) and (N+⅔). In this way, an adjusted feature template is generated.

The attribute value adjuster 101 then sends the offset values for each grid cell of the quantised feature template to the offset vector generator 57.

The attribute value adjuster 101 sends the adjusted feature template to the attribute value truncator 103 which generates, in step S55, a stabilised feature template by truncating each adjusted average grey level to an integer value. Fox example, if the value of the adjusted grey level is in the region (1+⅓) to (1 to ⅔), then the adjusted grey level value is truncated to a value of 1.

Returning to FIG. 4, the stabilised feature template is input to the picture value generator 79 which processes the attribute values of the stabilised feature template to generate the picture value. In this embodiment, the picture value generator 79 also sends data to an error correction vector generator 83 which forms part of the process data generator and generates an error correction vector which is used in a subsequent reading operation to improve the likelihood of generating the same picture value. The operations performed by the picture value generator 79 are summarised in FIG. 9.

The picture value generator 79 receives, in step S61, a stabilised feature template including two hundred and fifty-six features (i.e. the grid cells), each having an attribute (truncated average grey level) with an associated value. For such a large number of values, even with the described data stabilisation the likelihood of exactly repeating all of the values may be too low for a reliable number generator. However, in this embodiment only sixty-four of these values are used to generate the picture value, with the remaining one hundred and ninety-two values being used to perform error correction. This significantly improves the reliability of the number generation.

In particular, the picture value is generated using every fourth truncated grey level value (i.e the first, fifth, ninth, ... values). The values used to generate the picture value will hereafter be referred to as data values, whereas the remaining values will be referred to as redundant values. Each data value is associated with the three redundant values which immediately follow the data value.

The picture value generator 79 generates, in step S63, error correction data by applying a bitwise exclusive-OR operation between each redundant value and the corresponding data value to generate an error correction value. A typical sequence of data value followed by four redundant values would be as follows: 10;11;01;01. The corresponding three error correction values are: 01;11;11. It will be appreciated that these error correction values, on their own, give no information about the associated data value.

The picture value generator 79 sends, in step S65, the error correction data to the error correction vector generator 83 and then generates, in step S67, the picture value by concatenating all the data values in a predetermined order.

As described above, during the card manufacturing process an ambiguity resolution vector (including an exclusion vector, a unit vector and an offset vector) and an error correction vector, which together form process data, are generated and stored in the barcode 9. After the enrolment process, if the same picture is scanned, then use of the stored process data increases the likelihood that the same picture value is generated.

Card Reading System

A card reader 141 will now be described with reference to FIGS. 10 to 16.

As shown in FIG. 10, the card reader 141 includes an image scanner 143, a barcode reader 145 and a display 147 which are connected to a processor 149. Also connected to the processor 149 are a read only memory (ROM) 151, which stores processor-implementable instructions which are used during operation of the card reader 141, and a random access memory (RAM), which provides working memory for use during operation of the card reader 141.

In use, the image scanner 143 of the card reader 141 scans the picture 3 on the identity card 1 and the barcode reader 145 scans the barcode 9 on the identity card 1. The processor 149 processes both sets of scanned data to recover the personal details and to verify that the picture 3 is associated with the personal details, and the display 147 displays the stored personal details together with an indication of whether or not the picture 3 is associated with the personal details. The user of the card reader 141 is therefore able to check that neither the picture 3 nor the written personal details 7 on the identity card 1 have been tampered with after the card was issued.

The manner in which the processor 149 processes the scanned image data from the image scanner 143 and the scanned barcode data from the barcode reader 145 will now be explained with reference to FIGS. 11 to 16.

FIG. 11 is a schematic block diagram showing the functional configuration of the processor 149. As shown, the scanned barcode image data is input to a conventional barcode data recoverer 161, which recovers the authentication data (i.e. the process data 163, the personal data 165 and the digital signature 167) stored within the barcode 9.

The scanned image data from the image scanner 143 is input to an image converter 169 which applies a conventional image processing operation to identify the frame 5, and then transforms the co-ordinate system for the image data so that the origin is at the bottom lefthand corner of the frame 5 (as shown in FIG. 1) and the X and Y axes are in horizontal and vertical directions respectively (as shown in FIG. 1). The transformed image data is then input to a number generator 171, which calculates the picture value using the process data 163.

The picture value calculated by the number generator 171 is input, together with the personal data 165 and process data 163 recovered from the barcode 9, into an identification data generator 173 which, in the same manner as in the card manufacturing system, combines the picture value, the personal details and the process data to generate the identification data for the identity card 1.

The identification data generated by the identification data generator 173 is then input, together with the digital signature 167 recovered from the barcode 9, to an identity card verifier 175. The identity card verifier 175 processes the identification data and the digital signature 167 and outputs a verification signal indicating if the issuer of the identity card 1 has been verified, and whether or not the photograph shown in the identity card 1 is the original photograph used when the identity card 1 was issued. The personal data 165 recovered from the barcode 9 and the verification signal output by the identity card verifier 175 are input to a display data generator 177 which generates display data which causes the display 147 to show the personal details together with an indication as to whether or not the identity card 1 has been verified.

The number generator 171 will now be described in more detail with reference to FIGS. 12 to 15.

As shown in FIG. 12, the number generator 171 comprises a feature template generator 181, an attribute value stabiliser 183 and an picture value generator 185. The transformed image data output by the image converter 169 is input to the feature template generator 181, which generates a corresponding feature template using data from the ambiguity resolution vector 187, which forms part of the process data 163. The generated feature template is input to the attribute value stabiliser 183 which generates a stabilised feature template by adjusting the attribute values of the feature template using data from the ambiguity resolution vector 187.

FIG. 13 shows the main functional components of the feature template generator 181 and the attribute value stabiliser 183. As shown, the feature template generator 181 comprises an RGB to greyscale converter 201 which converts the colour image data to greyscale. The greyscale image date is input to a grid applier 203 which applies a 40 by 32 grid and excludes the grid cells corresponding to the excluded macrocells identified in the exclusion vector 207, which forms part of the ambiguity resolution vector 187. The data output by the grid applier 203 is then input to a grid cell grey value normaliser 205 which calculates a normalised average grey level value for each of the non-excluded grid cells in order to generate a feature template.

As discussed above, the feature template output by the feature template generator 181 is input to the attribute value stabiliser 183, which as shown in FIG. 13 comprises an attribute quantiser 209, an attribute value adjuster 211 and an attribute value truncater 213. The operations performed by the attribute value stabiliser will now be described with reference to FIG. 14.

When the attribute value stabiliser 183 receives, in step S71, a feature template from the feature template generator 181, the attribute quantiser 209 obtains the unit value from the unit vector 215, which forms part of the ambiguity resolution vector 187. The attribute quantiser then scales, in step S73, the normalised average grey level values for each cell using the unit value. The scaled feature template is then input to the attribute value adjuster 211 which obtains for each grid cell the corresponding offset value from the offset vector 217, which forms part of the ambiguity resolution vector 187. The attribute value adjuster 211 then adjusts, in step S75, the quantised value for the normalised grey level of a grid cell by adding the offset amount corresponding to the stored offset value. The adjusted feature template is input to the attribute value truncator 213 which generates, in step S77, the stabilised feature template by truncating the average grey level value for each grid cell to an integer value.

Returning to FIG. 12, the stabilised feature template is input to the picture value generator 185 which generate the picture value using the error correction vector 189. The operations performed by the picture value generator 185 will now be described with reference to FIG. 15.

As shown, upon receiving, in step S81, the stabilised feature template from the attribute value stabiliser 183, the picture value generator 185 corrects, in step S83, the attribute values using the error correction data stored in the error correction vector 189 to generate a corresponding correction value. In particular, each of the data values (i.e. the average grey level values for the first, fifth, ninth, . . . grid cells) is unchanged whereas a bitwise exclusive-OR operation is performed on each of the redundant values and the corresponding error correction value stored in the error correction vector 189. In this way, each data value should be identical to the three corresponding redundant values. If this is not the case, then a voting operation is performed on the data value and the three associated correction values and the data value is set to the average grey level value which appears most frequently.

FIG. 16 shows in more detail the main components of the identification card verifier 175. As shown, the identification data from the identification data generator 173 is input to a secure hashing algorithm unit 221 which applies the same secure hashing algorithm as applied in the card manufacturing system. The digital signature 167 recovered from the barcode 9 is input to a decryption unit 223 which decrypts the digital signature 167 using the public key $K_{pub}$ 225 for the card issuer.

The one-way hash output by the secure hashing algorithm unit 221 and the decrypted digital signature output by the decryption unit 223 are then input to a comparator 433 where they are compared. If the identity card 1 was produced by the card issuer and the picture 3 on the identity card 1 corresponds to the photograph 21 used by the card issuer, then the one-way hash output by the secure hashing algorithm unit 221 is identical to the decrypted digital signature output by the decryption unit 223 and the comparator 227 outputs a TRUE logic level, otherwise the comparator 227 outputs a FALSE logic level.

As described above, the identification data includes the process data. Therefore, even if the picture value becomes known, a counterfeiter cannot simply store new process data causing a different picture to give the picture value because the change in process data will be detected by the identification card verifier 175.

Second Embodiment

In the first embodiment, authentication data is stored on an identity card to be carried by the associated person. A problem with identity cards is that an identity card can either be lost or forgotten.

A second embodiment will now be described, with reference to FIGS. 17 to 20, in which the authentication data is stored in a central database, rather than an identity card, so that the identity of an enrolled person can be verified without an identity card.

In this embodiment, the authentication system is used by a large corporation to control access to a plurality of buildings owned by the corporation. In particular, as shown in FIG. 17 the corporation has a main office 251 and subsidiary offices 253A, 253B. The main office 251 includes an enrolment system 255 which generates authentication data that is stored in an authentication server 257. The main office 251 and the subsidiary offices 253A, 253B each have a respective pass issuer 259A, 259B, 259C which are able to issue passes, allowing access to parts of the main office 251 and subsidiary offices 253, to an individual whose identity has been verified, using the authentication data stored in the authentication server 257. The pass issuer 259a of the main office 251 is directly connected to the authentication server 257, and the pass issuers 259B, 259C of the subsidiary offices 253A, 253B are connected to the authentication server 257 via a computer network 261, which in this embodiment is a wide area network.

In this embodiment, the authentication data is generated using a biometric value representative of the iris of an individual. FIG. 18 shows the main components of the enrolment system 255. As shown, the enrolment system 255 includes an iris scanner 271, a display 273, a keyboard 275 and a mouse 277 which are connected to a processing system 279.

The iris scanner 271 scans the iris of an individual and sends corresponding image data I(x,y) to an image converter 281 forming part of the processing circuitry 279. The image converter 281 analyses the image data I(x,y) to extract the portion of the image data I(x,y) corresponding to the iris, and then processes the extracted portion to be in a standard alignment. During this processing, alignment data is generated and transmitted to a process data generator 283. The transformed image data output by the image converter 281 is input to a number generator 285 which generates a biometric value corresponding to the iris of the individual. Further details of how the biometric value and the process data are generated from the image data I(x,y) from the iris scanner 271 are found in International patent application WO 02/098053, whose content is incorporated herein by reference.

The display 273, the keyboard 275 and the mouse 277 are connected, via a user interface 287 to a personal data generator 289. During enrolment, the personal data generator 289 requests personal information of the individual being enrolled using the display 273, receives personal information input by the keyboard 275 and the mouse 277, and generates corresponding personal data.

The process data output by the process data generator 283, the biometric value output by the number generator 285, and the personal data output by the personal data generator 289 are input to an identification data generator 291, which forms identification data by concatenating the process data, the biometric value and the personal data. The identification data is then output to a digital signature generator 293, which forms a digital signature by generating a one-way hash of the identification data using the secure hashing algorithm and then encrypting the one-way hash with a private key associated with the enrolment system.

The digital signature generated by the digital signature generator 293 is then input, together with the process data and the personal data, to an authentication data generator 295 which combines the personal data, process data and digital signature to form authentication data. The authentication data is then output to the authentication server 257 via a communication unit 297.

As shown in FIG. 19, the authentication server 257 comprises a communication unit 301, which controls communication with the enrolment system 255 and the pass issuers 259, a controller 303 and a database 305. On receiving authentication data from the enrolment system 255 via the communication unit 301, the controller 203 stores the authentication data in the database 305.

After authentication data for an individual has been generated by the enrolment system 255 and stored in the authentication server 257, the individual is able to obtain a pass using any one of the pass issuers 259. FIG. 20 shows the main components of one of the pass issuers 259. As shown, the pass issuer 259 includes a communication unit 311 which controls communication with the authentication server 257. A user interface 313 is connected to the communication unit 311, and during operation an individual enters personal information using the user interface 313. The personal information is transmitted by the communication unit 311 to the authentication server 257, which retrieves from the database 305 the authentication data (i.e. the personal data, process data and digital signature) corresponding to the input personal information.

The pass issuer 259 also includes an iris scanner 315 which scans the iris of the individual and outputs the resultant image data to an image converter 317, which processes the image data using the alignment data within the retrieved process data 319 to generate transformed image data. The transformed image data is input to a number generator 321 which generates a biometric value representative of the iris of the individual using the process data 319. The biometric value generated by the number generator 321 is input, along with the process data 319 and the personal data 323 retrieved from the authentication server 257, to an authentication data generator 325 which generates authentication data in the same manner as the authentication data generator 295 of the enrolment system 255.

The authentication data generated by the authentication data generator 325 is input to an identity verifier 327 along with the digital signature 329 retrieved from the authentication server 257. The identity verifier 327 applies the secure hashing algorithm to the authentication data output by the authentication data generator 325 to generate a test one-way hash, and decrypts the digital signature 329 using the public key of the enrolment system 255 to generate a reference one-way hash.

The equality of the test and reference one-way hashes are then compared to verify if the personal information entered by the individual is correct. If the test and reference one-way hashes are identical, then the identity verifier 327 sends a control signal to an image processor 329 to generate image data, incorporating the personal data 323 received from the authentication server 257, which is then output to a card printer 331 which prints a pass card for the individual incorporating the personal data 323. If the first and second one-way hashes are not identical, then the identity verifier 327 does not send the control signal initiating the printing of the pass card.

It will be appreciated that in this embodiment if an individual, after enrolment, forgets or loses a pass card, then the individual is able to obtain another pass card by returning to any one of the pass issuers 259 in the main building 251 and the subsidiary buildings 253.

Third Embodiment

In the first embodiment, the picture value is incorporated within the identification data, the identification data is processed by a hashing algorithm to generate a one-way hash, and the one-way hash is encrypted using a private key to generate a digital signature. The reason for applying the hashing algorithm is to ensure that the picture value is not recoverable from the digital signature, thereby improving security.

The picture value need not be included in the identification data. A third embodiment will now be described, with reference to FIGS. 21 an 22, in which an identification number is assigned to the individual being enrolled, and a mapping key linking the identification number with the picture value is incorporated within the identification data and the authentication data. In FIGS. 21 and 22, components which are identical to corresponding components in the first embodiment have been referenced by the same numerals and will not be described in detail again.

As shown in FIG. 21, in this embodiment the processing system 351 of the card manufacturing system includes an identification number generator 353, which generates an identification number corresponding to the individual being enrolled. In this embodiment, the identification number generator is a conventional random number generator. The identification number generated by the identification number generator 353 is input to an encryption unit 355 together with the picture value output by the number generator 57. The encryption unit 355 applies a symmetric encryption algorithm, using the picture value as the cryptographic key, to encrypt the identification number and the resultant encrypted data forms a mapping key. In this embodiment, the encryption unit 355 applies a DES3 encryption algorithm.

Those skilled in the art will appreciate that, in the absence of the identification data, the mapping key gives away no information concerning the picture value.

The mapping key output by the encryption unit 355 is input to the identification data generator 63 together with the process data generated by the process data generator 59 and the identification number generated by the identification number generator 353. The identification data generator 63 combines the process data, the identification number and the mapping key to form identification data which is output to the digital signature generator 65, which generates a digital signature in the same manner as the first embodiment. The mapping key is also input to a barcode generator 357 together with the process data, the personal data and the digital signature. The barcode generator 357 generates image data for a barcode conveying the process data, the identification number, the encrypted data and the digital signature and outputs the barcode data to the image processor 69.

As shown in FIG. 22, during verification the barcode data recoverer 161 recovers the process data 163, the personal data 165, the mapping key 361 and the digital signature 363. As in the first embodiment, the process data 163 is used by the number generator 171 to recover a picture value, which is input to a decryption unit 365 together with the mapping key 361. The decryption unit 365 applies the same encryption algorithm as was used during enrolment (i.e. in this embodiment the DES3 encryption algorithm), using the picture value as the cryptographic key, to decrypt the mapping key, with the result of the decryption operation forming a test identification number.

The test identification number is input, together with the process data 163, the mapping key and the personal data 165, into an identification data generator 173, which generates test identification data. The test identification data is input to an identity card verifier 175 together with the digital signature 363. The identity card verifier 175 generates a test one-way hash by applying a secure hashing algorithm to the test identification number, and generates a reference one-way hash by decrypting the digital signature using the public key of the issuing authority. The equality of the test one-way hash and the reference one-way hash are then tested to verify the identity of the individual in the same manner as described in the first embodiment.

Modifications and Further Embodiments

In the third embodiment, the test and reference one-way hashes are generated by applying a hashing algorithm to identification data which does not include the picture value, and therefore the picture value obtained during enrolment is not compared with the picture value obtained during verification to verify the authenticity of the subject. This is possible because, unlike previous identification systems, in order for a positive result to occur during verification the picture value obtained during verification must be equal to, not merely similar to, the picture value obtained during enrolment. This allows greater freedom in the manner in which verification is performed.

An alternative identity card verifier for the first and third embodiments will now be described with reference to FIG. 23. In FIG. 23, components which are identical to corresponding components in FIG. 16 have been referenced by the same numerals and will not be described in detail again.

As shown in FIG. 23, the alternative identity card verifier 371 includes a random number generator 373 which outputs the same random number to first and second encryption units 375a and 375b, which both apply the same encryption algorithm (in this embodiment the DES3 encryption algorithm). The first encryption unit 375a encrypts the random number output by the random number generator 373 using the test one-way hash output by the secure hashing unit 221 as the cryptographic key. The second encryption unit 375b encrypts the random number output by the random number generator 373 using the reference one-way hash output by the decryption unit 223 as the cryptographic key. The equality of the outputs of the first and second encryption units 375 are then compared using the comparator 227.

In an alternative embodiment, the random number output by the random number generator 373 is first encrypted using the test one-way hash output by the secure hashing unit 221 as the cryptographic key, and then decrypted using the reference one-way hash output by the decryption unit 223 as the cryptographic key. The equality of the decrypted data and the original random number are then compared using a comparator.

Although in the third embodiment the mapping key and the process data are incorporated in the identification data, this is not essential. It is, however, preferred to "tamper-proof" the process data and the mapping key, i.e. to allow detection of any tampering with the process data and the mapping key. In an alternative embodiment, this is achieved by combining the process data and the mapping key, and encrypting the combined data using the private key of the issuing authority. In this way, during the verification the process data and the mapping key may be retrieved using the public key of the issuing authority, but it is almost impossible to tamper with the process data and mapping data generated during enrolment without knowledge of the private key of the issuing authority.

In the above-described embodiments, the authentication data allows verification of personal details, such as name and address, of an individual. It will be appreciated that in some applications only the authority of the individual to perform an act, such as enter a restricted area, need be tested, and therefore storage of personal data within the authentication data is not essential.

In an alternative embodiment, the personal data stored on the identification card is a reference number for a remote data base storing personal details for the individual associated with the identity card. For example, the reference number may be a national insurance or a social security number which allows details of the individual to be retrieved from a database. In this way, the amount of personal data which has to be stored on the identity card is reduced.

FIG. 24 schematically illustrates an authentication scheme which forms a further embodiment of the invention. As shown, in the enrolment process, an image of the iris of an eye of an individual being enrolled is scanned (step E1) by a scanner, and the resultant image data is processed to generate a biometric number (step E3). In this embodiment, the repeatability of the generated biometric number is improved by using the repeatable number generation techniques described in International Patent application WO 02/098053. An identity number is generated (step E5) which is completely arbitrary and is in no way dependent on the person being enrolled. In this embodiment, the identity number is generated using a random number generator. Transform information is then generated (step E7) indicating how to transform the biometric number into the identity number, and this transform information is stored together with the identity number of the person being enrolled as authentication information for use in a subsequent verification process.

In the verification process, the image of the iris is scanned (step V1) and a biometric number generated (step V3) in the same manner as during the enrolment process.

The biometric data is then transformed (step V5), using the stored transform data, to generate an identity number. This generated identity number is then compared (step V7) with a pre-stored identity number, and a decision is made as to whether or not the person whose iris was scanned is the same as the person whose iris was scanned during enrolment (step V9). In particular, in this embodiment if the generated identity number and the pre-stored identity number are identical, then it is confirmed that the person is the same as during enrolment. However, if the generated identity number and the pre-stored identity number are not equal, then it is indicated that the person is different to the person enrolled.

In the second embodiment, the authentication data is stored on a remote database. In an alternative embodiment, the stored authentication data is used to authenticate the identity of a party to a video conference. In particular, at the beginning of the video conference the party provides identification information enabling authentication information for the party to be retrieved from the remote database. The video and/or audio signal for the video conference are then analysed to derive biometric data representative of the party. The biometric data is processed using process data provided in the authentication data to generate a biometric number and then this biometric number is compared to a reference biometric number using the authentication data to authenticate the identity of the party.

As described in the first and third embodiments, by generating authentication data using the picture value, it is possible to allow detection of any tampering with the picture 3 on the identity card 1. Preferably, the process data is also used in the generation of the authentication data because this allows detection of any tampering with the process data stored in the identity card 1. Preferably, the personal data is also used in the generation of the authentication data because this allows detection of tampering with the personal details on the identity card 1.

Although in the described embodiments, a biometric value is concatenated with process data and personal data to form the identification data, other forms of combination (e.g. addition) are possible. Further, only selected parts of the biometric value, process data and personal data need be used.

In the first to third embodiments, a one-way hash derived from the identification data is encrypted using the RSA algorithm. It will be appreciated that other encryption algorithms could be used, but it is preferred to use the private key of an asymmetric encryption algorithm because this improves the security of the authentication system by allowing the one-way hash to be recovered using a public key while preventing tampering with the value of the one-way hash.

It is not essential to apply the hashing algorithm to the identification data prior to encryption. However, it is preferred to do so when the identification includes data whose secrecy is to be protected. For example, use of the hashing algorithm is preferred if the identification data is indicative of all or part of the biometric number or picture number.

In the first embodiment, biometric data for a user of the identity card, in the form of a picture, is stored on the identity card 1. An operator of the card reader 141 is then able to compare the face shown in the picture with the face of the user. Other forms of biometric data can, however, be used. For example, a fingerprint, an iris scan or a retina scan could be used.

In an alternative embodiment, the card reader automatically compares the face shown in the picture with the face of the user. In particular, the card reader includes a camera which records an image of the face of the user, and compares the resultant image data with image data for the image on the identity card 1.

For some forms of biometric data, the identity card 1 does not store the biometric data but rather the card manufacturing system and card reader obtains the biometric data directly from the user of the identity card 1. For example, this will be the case if a fingerprint, an iris scan or a retina scan is used.

If a fingerprint is used for the biometric data, then the scanner 23 of the card manufacturing system of the first embodiment is replaced by a fingerprint sensor, and the image scanner 143 of the card reader 141 of the first embodiment is replaced by a fingerprint sensor. Similarly, if an iris scan is used for the biometric data the scanner 23 of the card manufacturing system and the image scanner 143 of the card reader 141 are replaced by iris scanners, and if a retina scan is used for the biometric data then the scanner 23 of the card manufacturing system and the image scanner 143 of the card reader 141 are replaced by retina scanners.

International Patent Applications PCT/GB02/00626 and PCT/GB02/02512, whose contents are incorporated herein by reference, describe how to obtain a biometric value representative of a fingerprint, and iris or a retina.

In the first embodiment, the frame 5 around the picture of the user is used to establish a reference co-ordinate system by the card reader. Alternatively, other features on the card could be used to establish the reference co-ordinate system. If no convenient features are present on the identity card, then the outline of the identity card could be used to form a reference co-ordinate system. In an embodiment, alignment data is stored within the bar code indicating the location of the image with reference to a reference point on the card to facilitate processing.

The invention also has applicability to the identification of living creatures other than human beings. For example, the invention could be used for pet passports. Further, the invention could also be applied to inanimate objects, such as gemstones, which have a unique characterising physical feature which can be measured to determine physical data, and the physical data processed to determine a physical value representative of the inanimate object and process data in the same manner as the biometric data in the previous embodiments.

In the illustrated embodiments, the repeatability of a biometric value is improved by systematically adapting the manner in which properties of the picture are measured in accordance with process data generated by a training process. The way in which the processing of the image data is performed to arrive at the picture value is fundamentally different from conventional measurement systems.

Conventionally, the manner in which a measurement is performed is constrained by the need for the resulting number to conform to a measurement standard. For example, a distance is conventionally measured to conform with the international system of units of measurement (the SI system) so that the distance value can be compared with other distance values. The focus of the conventional measurement system is to maximise the accuracy of the measurement within the constraints of the measurement standard.

For the identification system described in the illustrated embodiments, it has been recognised that when generating a biometric value, the accuracy of the biometric value compared to a measurement standard is not important, but instead the repeatability of the biometric value is important. Therefore, the conventional constraints associated with obtaining accurate measurement values have been discarded and techniques have been developed to improve the repeatability of the biometric value instead.

In particular, in the illustrated embodiment, during the card manufacturing process, a number of measurements are performed on the biometric data (the photograph 21), and then the sensitivity of the biometric value (the picture value) to variations in the measurement values is analysed. The card manufacturing system then determines process instructions (the ambiguity resolution vector) which modify the measurement values to reduce the sensitivity of the biometric value to changes in the measurement values.

As described in the first embodiment, a stable set of features can be obtained by applying an arbitrary (in the sense that it is not related to the analogue data) division of the analogue data into separate parts (i.e. a grid is applied to a two-dimensional array of image data). Instead of applying an arbitrary segregation of the analogue data, the data could be segregated in accordance with the information content of the data to generate features. For example, the grid cell sizes could be varied across a two-dimensional data array in dependence upon the way the data varies across the two-dimensional array. Alternatively, the features could inherently form part of the information content of the biometric data (for example, minutiae within a fingerprint).

In the first embodiment, the feature template generator applies the grid and excludes grid cells before normalisation of the grid cell grey values. Alternatively, the grey values could be normalised before the grid is applied using grey level values for the entire picture.

In the first embodiment, the attribute value is determined by performing a truncation of a measurement value to an integer value. This means that the ambiguity in the attribute value will be greatest when the measurement value is close to an integer value, as the chance of the measurement value being less than the integer value in a subsequent measurement is approximately equal to the chance of the measurement value being more than the measurement value. Therefore, in the first embodiment the measurement value is offset to be approximately midway between two integer levels. In an alternative embodiment, the attribute value is determined by rounding a measurement value to the nearest integer value. In this case, the greatest ambiguity occurs for measurement values approximately midway between neighbouring integer values, and therefore an offset vector is generated to shift the measurement value towards an integer value. In general, the range of measurement values corresponding to an attribute value can be arbitrarily set.

In the first embodiment, in order to reduce the amount of data stored in the ambiguity resolution vector, a sparse offset vector is used which stores an offset value, in the form of a base three-number, for shifting a measurement value to be within a range of 0.33 units. It will be appreciated that a base two number could be used to shift the measurement value to be within a range of 0.5 units, a base four number could be used to shift the measurement value to be within a range of 0.25 units, etc. The higher the base used for the offset value, the greater the repeatability of the biometric value. However, the higher the base used for the offset value, the greater the amount of data which is stored in the offset vector.

In an embodiment, the card manufacturing system can calculate the amount of data required for the offset vector for different number bases, and then select the highest number base which can be stored. In this case, the number base used for the offset vector is preferably stored as part of the ambiguity resolution vector.

In the first embodiment, each attribute value used for determining the number (each data value) is associated with three error correction values. However, the more significant bits of the data value are more stable than the less significant bits and therefore the use of the error correction data can be made more efficient. In an alternative embodiment, separate error correction data is used for each bit of a data value, with the amount of error correction bits per data bit increasing from the most significant data bit to the least significant data bit.

An alternative to using the described error correction vector is to generate multiple batches of analogue data to generate multiple stabilised feature templates, and then to employ a voting regime to identify the most frequently occurring attribute values across the multiple stabilised feature templates.

In the described card manufacturing system, an operator selects which parts of the image are to be used to generate the picture value. Alternatively, conventional image processing operations could be performed to identify macro-cells including distinctive facial features.

It will be appreciated that the grid sizes for the macro-cells and grid cells can be varied. Preferably, one macro-cell includes an exact number of grid cells because this simplifies the processing performed. However this is not essential as for example, the grid applier could exclude all grid cells which do not fall completely within a single macro-cell.

As described in the first embodiment, a repeatable biometric value is obtainable using an ambiguity resolution vector and an error correction vector. In other embodiments, only the error correction vector is used.

An alternative example of a system for obtaining a repeatable number from an image of an iris using error correction coding is described in the article "On the relation of error correction and cryptography to an offline biometric based identification scheme", WCC99, Workshop on Coding and Cryptography, January 1999, Paris, France. In this article, a biometric value is generated and then a conventional error detection and correction algorithm is used to generate error correction data. This error correction data is then stored for use in subsequent measurements of the biometric value.

In the first embodiment, the identity card 1 has written personal details 7 shown thereon, and also has the personal details stored in the barcode 9. It will be appreciated that the written personal details are not essential as the card reader 1 displays the personal details.

In the first and third embodiments, an identification device in the form of an identity card is produced. It will be appreciated that in the same manner a passport, a driving license, a library card or a credit card could be produced incorporating the features of the illustrated identity card.

In an embodiment, authentication data for an existing identity card is produced. The authentication data can then be added or attached to the existing identity card, stored on a separate carrier, or stored in a central database along with authentication data associated with other identity cards.

It is also possible for an identification device to be associated with plural issuing authorities, with each issuing authority generating and storing on the identity card, or on a separate document, respective different authentication data. For example, visa stamps for a passport could include a digital signature derived using the picture in the passport. In this way, when a visa issuing authority is satisfied with the genuineness of a passport, the visa stamp helps detection of any tampering with the passport after the visa has been issued.

In the first and third embodiments, the personal data, the process data and the digital signature are stored in a barcode on a card. Other forms of carrier could, however, be used. For example, the identification device could be in the form of a smart card or a radio frequency ID (RFID) tag, in which case the personal data, the process data and the digital signature could be stored in an electronic memory.

In the card reader of the first embodiment, a dedicated barcode reader is used to read the barcode 9 on the identity card 1. In an alternative embodiment, the image scanner scans the entire identity card 1 and pattern recognition software retrieves the data stored in the barcode 9.

The processing of the biometric data can either be performed by a hardware device, software running on a computer, or the processing could be split between a hardware device and software running on a computer. As many of the processing operations are suited to different sources of analogue data, the invention is well suited to being implemented in software using an object oriented programming language such as Java or C++.

As described, as well as computer apparatus and processes performed in the computer apparatus, the invention also extends to computer programs, particularly computer programs on or in a carrier, adapted for putting the invention into practice. The computer program may be in the form of source code, object code, a code intermediate source and object code such as in partially compiled form, or in any other form suitable for use in the implementation of the processes according to the invention.

The carrier may be any entity or device capable of carrying the program. For example, the carrier may comprise a storage medium such as a ROM, for example a CD ROM or a semiconductor ROM, or a magnetic recording medium, for example a floppy disk or hard disk. Further, the carrier may be a transmissible carrier such as an electrical or optical signal which may be conveyed via electrical or optical cable or by radio or other means.

When the program is embodied in a signal which may be conveyed directly by a cable or other device or means, the carrier may be constituted by such cable or other device or means. Alternatively, the carrier may be an integrated circuit in which the program is embedded, the integrated circuit being adapted for performing, or for use in the performance of, the relevant processes.

What is claimed is:

1. A method of generating authentication data for authenticating a subject, the method comprising a computer to execute the steps of:
   receiving physical data representing a physical characteristic of the subject;
   processing the physical data by performing a predetermined processing operation to generate i) a reference number whose value is representative of the subject, and ii) variability correction data for improving the repeatability of the generation of the reference number;
   generating identification data comprising at least part of the reference number and at least part of the variability correction data;
   encrypting the generated identification data; and
   generating authentication data comprising said variability correction data and said encrypted data,
   wherein said encrypting step comprises applying a one-way encryption algorithm to said identification data to generate a hash value, and applying a two-way encryption algorithm to encrypt the generated hash value.

2. A method according to claim 1, wherein said encrypting step comprises applying the Secure Hashing Algorithm to generate said hash value.

3. A method according to claim 1, wherein said two-way encryption algorithm applying step comprises encrypting the hash value using the private key of an asymmetric encryption algorithm.

4. A method according to claim 1, further comprising receiving personal data for the subject,
   wherein said authentication data generating step comprises generating authentication data comprising said personal data.

5. A method according to claim 1, wherein said processing step comprises:
   receiving at least one training set of physical data;
   performing a set of measurements on the or each of the at least one training set of physical data to obtain for the or each training set a corresponding set of measurement values;
   analysing for at least one of the set of measurement values, the sensitivity of the generated reference number to change in the measurement value, and determining at least one process instruction operable to modify the processing of the measurement value to reduce the sensitivity of the reference number to change in the measurement value; and
   generating said variability correction data using the determined processing instructions.

6. A method according to claim 1, wherein said processing step comprises:
   receiving at least one training set of physical data;
   performing a set of measurements on the or each of the at least one training set of physical data to obtain for the or each training set a corresponding set of measurement values;
   generating the reference number using the generated measurement values;
   generating error correction data for the generated reference number; and
   generating variability correction data using the generated error correction data.

7. A method according to claim 6, wherein the or each set of measurement values is separated into a first subset and a second subset,
   wherein said reference number generating step generates the reference number using the or each first subset, and
   wherein said variability correction data generating step comprises transforming said error correction data using the or each second subset to generate at least part of the variability correction data.

8. A method of authenticating a subject, the method comprising a computer to execute the steps of:
   retrieving authentication data comprising encrypted data indicative of a reference number whose value is representative of a reference subject, and variability correction data relating to the generation of the reference number;
   decrypting the encrypted data to generate decrypted data;
   receiving physical data associated with a physical characteristic of the subject;

processing the physical data using said variability correction data to generate a test number; and testing the equality of the reference number and the test number using the retrieved authentication data and the generated test number to determine the authenticity of the test subject, wherein said testing step comprises generating test identification data using at least part of the test number and at least part of the variability correction data, applying a one-way encryption algorithm to said test identification data to generate a test hash value, and testing the equality of the test hash value and the decrypted data.

9. A method according to claim 8, wherein said testing step comprises applying the Secure Hashing Algorithm to said test identification data to generate the test hash value.

10. A method according to claim 8, wherein said decrypting step comprises decrypting the encrypted data using the public key of an asymmetric encryption algorithm.

11. A method according to claim 8, wherein said authentication data comprises transform data, and wherein said test identification data generating step comprises transforming said test number, using said transform data, to generate a test identification number, and generating the test identification data using at least part of the test identification number.

12. A method according to claim 8, further comprising the step of receiving personal data for the subject being authenticated, wherein said test identification data generating step comprises generating test identification data using at least part of said personal data.

13. A method according to claim 8, wherein said testing step comprises comparing said test hash value and said decrypted data.

14. A method according to claim 8, wherein said testing step comprises the steps of:

generating token data; and applying a mathematical algorithm to the token data using one of said test hash value and said decrypted data as a parameter of the algorithm to generate a first result; and applying the mathematical algorithm to the token data using the other of said test hash value and said decrypted data as a parameter of the algorithm to generate a second result; and comparing the first result and the second result.

15. A method according to claim 8, wherein said testing step comprises the steps of:

generating token data; and applying a first mathematical algorithm to the token data using one of said test hash value and said decrypted data as a parameter of the algorithm to generate a first result; and applying a second mathematical algorithm, which is the inverse of the first mathematical algorithm, to the token data using the other of said test hash value and said decrypted data as a parameter of the algorithm to generate a second result; and directly comparing the token data and the second result.

16. A method according to claim 8, wherein the subject is a human being.

17. A method according to claim 16, further comprising a step of measuring a distinctive physical characteristic of the human being to generate said physical data.

18. An apparatus for generating authentication data to authenticate a subject, the apparatus comprising:

a receiver operable to receive physical data representing a physical characteristic of the subject;

a processor operable to perform a predetermined processing operation on the physical data to generate i) a reference number, whose value is representative of the subject, and ii) variability correction data for improving the repeatability of the generation of the reference number;

an identification data generator operable to generate identification data comprising at least part of the reference number and at least part of the variability correction data;

an encrypter operable to encrypt the generated identification data to generate encrypted data;

an authentication data generator operable to generate authentication data comprising said variability correction data and said encrypted data, wherein said encrypter is operable to apply a one-way encryption algorithm to said identification data to generate a hash value, and to apply a two-way encryption algorithm to encrypt the generated hash value.

19. An apparatus according to claim 18, wherein said encrypter is operable to apply the Secure Hashing Algorithm to said identification data to generate said hash value.

20. An apparatus according to claim 18, wherein said encrypter is operable to encrypt the hash value using the private key of an asymmetric encryption algorithm.

21. An apparatus according to claim 18, further comprising a receiver operable to receive personal data for the subject, wherein said authentication data generator is operable to generate authentication data comprising said personal data.

22. An apparatus according to claim 18, wherein said processor is operable to:

receive at least one training set of physical data;

perform a set of measurements on the or each of the at least one training set of physical data to obtain for the or each training set a corresponding set of measurement values;

analyse for at least one of the set of measurement values, the sensitivity of the generated reference number to change in the measurement value, and determine at least one process instruction operable to modify the processing of the measurement value to reduce the sensitivity of the reference number to change in the measurement value; and generate said variability correction data using the determined processing instructions.

23. An apparatus according to claim 18, wherein said processor is operable to:

receive at least one training set of physical data;

perform a set of measurements on the or each of the at least one training set of physical data to obtain for the or each training set a corresponding set of measurement values;

generate the reference number using the generated measurement values;

generate error correction data for the generated reference number; and generate variability correction data using the generated error correction data.

24. An apparatus according to claim 23, wherein the processor is operable to:

separate the or each set of measurement values into a first subset and a second subset, to generate the reference number using the or each first subset, and to transform said error correction data using the or each second subset to generate at least part of the variability correction data.

25. An apparatus for authenticating a subject, the apparatus comprising:
- a retriever operable to retrieve authentication data comprising encrypted data indicative of a reference number whose value is representative of a reference subject, and variability correction data relating to the generation of the reference number;
- a decrypter operable to decrypt the encrypted data to generate decrypted data;
- a receiver operable to receive physical data associated with a physical characteristic of the subject;
- a processor operable to process the physical data using said variability correction data to generate a test number; and
- a tester operable to test the equality of the reference number and the test number using the retrieved authentication data and the generated test number to determine the authenticity of the test subject,
- wherein said tester comprises a test identification data generator operable to generate test identification data using at least part of the test number and at least part of the variability correction data and an encrypter operable to apply a one-way encryption algorithm to said test identification data to generate a test hash value, wherein the tester is operable to test the equality of the test hash value and the decrypted data.

26. An apparatus according to claim 25, wherein the encrypter is operable to apply the Secure Hashing Algorithm to the test identification date to generate the test hash value.

27. An apparatus according to claim 25, wherein said decrypter is operable to decrypt the encrypted data using the public key of an asymmetric encryption algorithm.

28. An apparatus according to claim 25, wherein said authentication data comprises transform data, and
- wherein said apparatus further comprises a transformer operable to transform said test number, using said transform data, to generate a test identification number, and
- wherein said identification data generator is operable to generate test identification data comprising at least part of the test identification number.

29. An apparatus according to claim 25, further comprising a receiver operable to receive personal data for the subject being authenticated,
- wherein said identification data generator is operable to generate test identification data using said personal data.

30. An apparatus according to claim 25, wherein said tester is operable to compare said test identification data and said decrypted data.

31. An apparatus according to claim 25, wherein said tester comprises:
- a data generator operable to generate token data; and
- a mathematical algorithm applier operable to apply a mathematical algorithm to the token data using one of said test identification data and said decrypted data as a parameter of the algorithm to generate a first result, and to apply the mathematical algorithm to the token data using the other of said test identification data and said decrypted data as a parameter of the algorithm to generate a second result; and
- a comparator operable to compare the first result and the second result.

32. An apparatus according to claim 25, wherein said tester comprises:
- a data generator operable to generate token data; and
- a first mathematical algorithm applier operable to apply a first mathematical algorithm to the token data using one of said test identification data and said decrypted data as a parameter of the algorithm to generate a first result; and
- a second mathematical algorithm applier operable to apply a second mathematical algorithm, which is the inverse of the first mathematical algorithm, to the token data using the other of said test identification data and said decrypted data as a parameter of the algorithm to generate a second result; and
- a comparator operable to compare the token data and the second result.

33. An apparatus according to claim 25, further comprises a biometric data measurer operable to measure a distinctive physical characteristic of a human being to generate said physical data.

34. A storage device storing instructions including instructions for causing a programmable apparatus to perform a method of generating authentication data for authenticating a subject, the method comprising the steps of:
- receiving physical data representing a physical characteristic of the subject;
- processing the physical data by performing a predetermined processing operation to generate i) a reference number whose value is representative of the subject, and ii) variability correction data for improving the repeatability of the generation of the reference number;
- generating identification data comprising at least part of the reference number and at least part of the variability correction data;
- encrypting the generated identification data; and
- generating authentication data comprising said variability correction data and said encrypted data,
- wherein said encrypting step comprises applying a one-way encryption algorithm to said identification data to generate a hash value, and applying a two-way encryption algorithm to encrypt the generated hash value.

35. A storage device storing instructions including instructions for causing a programmable apparatus to perform a method of authenticating a subject, the method comprising the steps of:
- retrieving authentication data comprising encrypted data indicative of a reference number whose value is representative of a reference subject, and variability correction data relating to the generation of the reference number;
- decrypting the encrypted data to generate decrypted data;
- receiving physical data associated with a physical characteristic of the subject;
- processing the physical data using said variability correction data to generate a test number; and
- testing the equality of the reference number and the test number using the retrieved authentication data and the generated test number to determine the authenticity of the test subject,
- wherein said testing step comprises generating test identification data using at least part of the test number and at least part of the variability correction data, applying a one-way encryption algorithm to said test identification data to generate a test hash value, and testing the equality of the test hash value and the decrypted data.

* * * * *